United States Patent
Kobayashi et al.

(10) Patent No.: US 9,676,937 B2
(45) Date of Patent: Jun. 13, 2017

(54) EPOXY RESIN COMPOSITION, PREPREG AND FIBER-REINFORCED COMPOSITE MATERIAL

(71) Applicant: TORAY INDUSTRIES, INC., Tokyo (JP)

(72) Inventors: Hiroshi Kobayashi, Nagoya (JP); Takahiko Otsubo, Nagoya (JP); Hiroshi Takezaki, Nagoya (JP); Nobuyuki Tomioka, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/895,884

(22) PCT Filed: Aug. 1, 2014

(86) PCT No.: PCT/JP2014/070373
§ 371 (c)(1),
(2) Date: Dec. 3, 2015

(87) PCT Pub. No.: WO2015/019965
PCT Pub. Date: Feb. 12, 2015

(65) Prior Publication Data
US 2016/0122528 A1    May 5, 2016

(30) Foreign Application Priority Data

Aug. 7, 2013 (JP) ................................. 2013-163865

(51) Int. Cl.
| C08L 63/00 | (2006.01) |
| C08J 5/24 | (2006.01) |
| C08L 77/06 | (2006.01) |
| C08J 5/04 | (2006.01) |
| C08G 59/50 | (2006.01) |

(52) U.S. Cl.
CPC .......... C08L 63/00 (2013.01); C08G 59/5033 (2013.01); C08J 5/042 (2013.01); C08J 5/24 (2013.01); C08L 77/06 (2013.01); *C08J 2363/00* (2013.01); *C08J 2400/22* (2013.01); *C08J 2400/26* (2013.01); *C08J 2467/02* (2013.01); *C08J 2477/00* (2013.01)

(58) Field of Classification Search
None
See application file for complete search history.

(56) References Cited

U.S. PATENT DOCUMENTS

| 5,028,478 A * | 7/1991 | Odagiri ............... C08J 5/24 428/327 |
| 2013/0202873 A1 | 8/2013 | Mizuki et al. |
| 2013/0337263 A1 | 12/2013 | Asano et al. |
| 2014/0309337 A1 | 10/2014 | Nagano et al. |
| 2015/0031834 A1 | 1/2015 | Kobayashi et al. |
| 2015/0344686 A1* | 12/2015 | Shimizu ............... C08J 5/24 523/468 |

FOREIGN PATENT DOCUMENTS

| EP | 0723994 A1 | 7/1996 | |
| EP | 2669331 A1 | 12/2013 | |
| JP | 2008-239638 A * | 10/2008 | |
| JP | 2009-221460 A * | 10/2009 | |
| JP | WO 2010/055811 A1 * | 5/2010 | ......... C08G 18/3872 |
| JP | WO 2012/039456 A1 * | 3/2012 | ............. C08G 59/38 |
| JP | WO 2012/043509 A1 * | 4/2012 | ................ C08J 3/14 |
| KR | WO 2015/115844 A1 * | 8/2015 | ........ H04W 74/0833 |
| WO | WO 2009/142231 A1 | 11/2009 | |
| WO | WO 2012/039456 A1 | 3/2012 | |
| WO | WO 2013/099862 A1 | 7/2013 | |
| WO | WO 2013/122008 A1 | 8/2013 | |

OTHER PUBLICATIONS

International Search Report, issued in PCT/JP2014/070373, dated Sep. 16, 2014.
Extended European Search Report, dated Feb. 16, 2017, for European Application No. 14834468.2.

* cited by examiner

*Primary Examiner* — Ana Woodward
(74) *Attorney, Agent, or Firm* — Birch, Stewart, Kolasch & Birch, LLP

(57) ABSTRACT

[Problem] To provide: a fiber-reinforced composite material having both Mode I interlaminar fracture toughness and compressive strength under wet heat conditions; an epoxy resin composition for producing the fiber-reinforced composite material; and a prepreg produced using the epoxy resin composition. [Solution] An epoxy resin composition comprising at least the following constituents [A], [B] and [C]: [A] an epoxy resin; [B] composite polyamide microparticles which satisfy such a requirement (b1) the materials constituting the particles are a polyamide (B1) and a thermoplastic elastomer resin (B2), such a requirement (b2) that the melting point or the glass transition temperature of the polyamide (B1) is higher than 100° C. and such a requirement (b3) the number average particle diameter is 0.1 to 100 µm; and [C] a curing agent.

14 Claims, No Drawings

EPOXY RESIN COMPOSITION, PREPREG AND FIBER-REINFORCED COMPOSITE MATERIAL

TECHNICAL FIELD

The present invention relates to an epoxy resin composition that serves to produce a fiber-reinforced composite material having both interlaminar toughness and high compressive strength under wet heat conditions; and a prepreg and fiber-reinforced composite material produced therefrom.

BACKGROUND ART

High in specific strength and specific rigidity, fiber-reinforced composite materials are useful and have been used in a wide variety of applications including aircraft structure members, windmill blades, automobiles' exterior plates, and computer parts such as IC trays and laptop enclosures (housing), and demands for them have been increasing every year.

A fiber-reinforced composite material has a heterogeneous structure produced by molding a prepreg consisting essentially of reinforcement fiber such as carbon fiber and a matrix resin, and accordingly, such a structure has large differences in physical properties between the alignment direction of the reinforcement fiber and other directions. For instance, it is known that the interlaminar toughness, which represents the resistance to interlaminar fracture of the reinforcement fiber layers, cannot be improved drastically by simply increasing the strength of the reinforcement fiber. In particular, fiber-reinforced composite materials containing a thermosetting resin as matrix resin are generally liable to be fractured easily by a stress caused in a direction other than the alignment direction of the reinforcement fiber, reflecting the low toughness of the matrix resin. In this respect, various techniques have been proposed aiming to provide composite materials that have improved physical properties, including interlaminar toughness, to resist a stress in directions other than the alignment direction of the reinforcement fibers while maintaining high compressive strength in the fiber direction under high temperature and high humidity conditions, which is required for manufacturing aircraft structural members.

Furthermore, fiber-reinforced composite materials have recently been applied to an increased range of aircraft structural members, and fiber-reinforced composite materials are also in wider use for windmill blades and various turbines designed to achieving improved power generation efficiency and energy conversion efficiency. Studies have been made to provide thick members produced from prepreg sheets consisting of an increased number of layers as well as members having three-dimensionally curved surfaces. If such a thick member or curved-surfaced member suffers from a load, i.e., tensile or compression stress, the prepreg fiber layers may receive a peeling stress generated in an antiplane direction, which can cause opening-mode interlayer cracks. As these cracks propagate, the overall strength and rigidity of the member can deteriorate, possibly leading to destruction of the entire member. Opening-mode, that is, Mode I, interlaminar toughness is necessary to resist this stress.

Compared to this, there is a proposal of a technique that uses high-toughness particle material of, for example, polyamide provided in regions between fiber layers so that the Mode II interlaminar toughness will be increased to prevent damage to the surface that may be caused in falling weight impact test (see patent document 1).

Aside from this, another document has disclosed a material that contains polyamide fine particles including specific polyamide combined with a thermosetting resin and have high strength against interlaminar shearing under wet heat conditions in addition to impact resistance (see patent document 2). Another document has disclosed thermoplastic resin particles in which a thermoplastic resin insoluble in a matrix resin is melt-blended with a thermoplastic resin soluble in the matrix resin (see patent document 3).

Aside from this, there is known a technique in which specific thermoplastic resin particles are combined with a matrix resin containing an elastomer as a technique aimed at improving Mode II interlaminar toughness (patent document 4).

PRIOR ART DOCUMENTS

Patent Documents

Patent Document 1: U.S. Pat. No. 5,028,478 (specification)
Patent document 2: Japanese Unexamined Patent Application Publication No. 2009-221460
Patent document 3: International Publication No. WO 2010/055811
Patent document 4: International Publication No. WO 2012/039456

SUMMARY OF THE INVENTION

Problems to be Solved by the Invention

Even the technique described in cited document 1, however, cannot serve adequately in the case of Mode I interlaminar toughness.

The technique described in cited document 3 is aimed at improving impact resistance and Mode II interlaminar toughness, and does not exhibit an effect of improving Mode I interlaminar toughness.

The technique described in cited document 4 does not necessarily ensure sufficient compressive strength under wet heat conditions because an elastomer component is added to the matrix resin, and thus the elastic modulus of the matrix decreases.

An object of the present invention is to provide a an epoxy resin composition that serves to produce a fiber-reinforced composite material having remarkably excellent Mode I interlaminar toughness while maintaining compressive strength under wet heat conditions; and a prepreg and fiber-reinforced composite material produced therefrom.

Solutions to the Problems

For achieving the above-mentioned object, the present inventors have extensively conducted studies, and resultantly arrived at the following invention. That is, the present invention provides the following.

[1] An epoxy resin composition including at least the following constituents [A], [B] and [C]:
[A] epoxy resin;
[B] composite polyamide fine particles satisfying the following requirements (b1) to (b3):
(b1) the materials that form the particles are polyamide (B1) and thermoplastic elastomer resin (B2);
(b2) the melting point or glass transition temperature of polyamide (B1) is higher than 100° C.; and
(b3) the average particle diameter is 0.1 to 100 μm, and
[C] curing agent.

[2] The epoxy resin composition according to [1], wherein constituent [B] has a dispersion structure in which a plurality of domains mainly composed of thermoplastic elastomer resin (B2) are dispersed in a matrix mainly composed of polyamide (B1).

[3] The epoxy resin composition according to [2], wherein the average particle diameter of the domains mainly composed of thermoplastic elastomer resin (B2) is 0.05 to 50 and the sphericity of constituent [B] is 80 or more.

[4] The epoxy resin composition according to any one of [1] to [3], wherein the relationship of $|\delta_{B1}-\delta_{B2}|\geq 0.1\ [(J/cm^3)^{1/2}]$ is satisfied where the solubility parameters of polyamide (B1) and thermoplastic elastomer resin (B2) are $\delta_{B1}$ and $\delta_{B2}$, respectively.

[5] The epoxy resin composition according to any one of [1] to [4], wherein the content of thermoplastic elastomer resin (B2) is 0.1 to 50 volume % based on the total amount of the composite polyamide fine particles.

[6] The epoxy resin composition according to any one of [1] to [5], wherein the particle diameter distribution index of constituent [B] is 1.0 to 3.0.

[7] The epoxy resin composition according to any one of [1] to [6], wherein constituent [A] contains a polyfunctional amine type epoxy resin.

[8] The epoxy resin composition according to any one of [1] to [7], wherein constituent [C] is an aromatic polyamine.

[9] A prepreg produced by impregnating reinforcement fibers with the epoxy resin composition according to any one of [1] to [8].

[10] The prepreg according to [9], wherein constituent [B] is distributed in a higher concentration on the surface of the prepreg than at the inside of the prepreg.

[11] The prepreg according to [10], wherein 90% or more of constituent [B] is localized within the depth range of 20% of the thickness of the prepreg from the surface of the prepreg.

[12] The prepreg according to any one of [9] to [11], wherein the reinforcement fibers are carbon fibers.

[13] A fiber-reinforced composite material produced by curing the prepreg according to any one of [9] to [12].

[14] A fiber-reinforced composite material including a cured product of the epoxy resin composition according to any one of [1] to [8], and reinforcement fibers.

Effects of the Invention

According to the present invention, it is possible to provide a fiber-reinforced composite material having both Mode I interlaminar toughness and compressive strength under wet heat conditions, as well as an epoxy resin composition and a prepreg that serve for production of the fiber-reinforced composite material.

EMBODIMENTS OF THE INVENTION

The epoxy resin composition, prepreg and fiber-reinforced composite material according to the present invention are described in detail below.

The epoxy resin composition according to the present invention is an epoxy resin composition including at least the following constituents [A], [B] and [C] (hereinafter, occasionally referred to as a "resin composition").
[A] epoxy resin;
[B] composite polyamide fine particles satisfying the following requirements (b1) to (b3):
(b1) the materials that form the particles are polyamide (B1) and thermoplastic elastomer resin (B2);
(b2) the melting point or glass transition temperature of polyamide (B1) is higher than 100° C.; and
(b3) the average particle diameter is 0.1 to 100 μm, and
[C] curing agent.

Epoxy resin [A] designed for the present invention is a compound having two or more epoxy groups in one molecule.

Examples of epoxy resin [A] to be used for the present invention include aromatic glycidyl ethers produced from a phenolic compound having two or more phenolic hydroxyl groups in the molecule, aliphatic glycidyl ethers produced from an aliphatic alcohol having a plurality of hydroxyl groups in the molecule, glycidyl amines produced from an amine, glycidyl esters produced from a carboxylic acid having a plurality of carboxyl groups, and epoxy resins having a plurality of oxirane rings in the molecule.

In particular, glycidyl amine type epoxy resins are preferred because they are low in viscosity and able to impregnate reinforcement fiber easily and accordingly can serve to produce fiber-reinforced composite materials having good mechanical characteristics including heat resistance and elastic modulus. Such glycidyl amine type epoxy resins can be roughly divided into two groups: polyfunctional amine type epoxy resins and bifunctional amine type epoxy resins.

In the present invention, the polyfunctional amine type epoxy resin is an amine type epoxy containing three or more epoxy groups in one epoxy resin molecule. Such polyfunctional amine type epoxy resins include, for instance, tetraglycidyl diaminodiphenyl methane, triglycidyl aminophenol, tetraglycidylxylylene diamine, and diglycidyl aniline, as well as halogen-substituted compounds, alkyl-substituted compounds, aralkyl-substituted compounds, allyl-substituted compounds, alkoxy-substituted compounds, aralkoxy-substituted compounds, allyloxy-substituted compounds, and hydrogenated compounds thereof.

There are no specific limitations on the polyfunctional amine type epoxy resin to be used, but preferred ones include tetraglycidyl diaminodiphenyl methane, triglycidyl aminophenol, tetraglycidyl xylylene diamine, and substituted or hydrogenated compounds thereof.

Useful tetraglycidyl diaminodiphenyl methane as described above include "Sumiepoxy (registered trademark)" ELM434 (supplied by Sumitomo Chemical Co., Ltd.), YH434L (supplied by NIPPON STEEL & SUMIKIN CHEMICAL CO., LTD.), "jER (registered trademark)" 604 (supplied by Mitsubishi Chemical Corporation), and "Araldite (registered trademark)" MY720 or MY721 (supplied by Huntsman Advanced Materials Gmbh). Useful triglycidyl aminophenols and alkyl-substituted compounds thereof include "Sumiepoxy (registered trademark)" ELM100 or ELM120 (supplied by Sumitomo Chemical Co., Ltd.), "Araldite (registered trademark)" MY0500, MY0510, or MY0600 (supplied by Huntsman Advanced Materials Gmbh), and "jER (registered trademark)" 630 (supplied by Mitsubishi Chemical Corporation). Useful tetraglycidyl xylylene diamines and hydrogenated compounds thereof include "TETRAD (registered trademark)"-X and "TETRAD (registered trademark)"-C (supplied by Mitsubishi Gas Chemical Co., Inc.).

There are no specific limitations on the difunctional amine type epoxy resin to be used, but preferred ones include diglycidyl aniline, and substituted or hydrogenated compounds thereof. Examples of the useful diglycidyl aniline include GAN (supplied by Nippon Kayaku Co., Ltd.), and examples of the useful alkyl-substituted compound of diglycidyl aniline include GOT (supplied by Nippon Kayaku Co., Ltd.). Further, examples of the allyloxy substituted compound of diglycidyl aniline include N,N-diglycidyl-4-phenoxyaniline, N,N-diglycidyl-4-(4-methylphenoxy)aniline, N,N-diglycidyl-4-(4-tert-butylphenoxy)aniline and N,N-diglycidyl-4-(4-phenoxyphenoxy)aniline.

Polyfunctional amine type epoxy resins are used preferably as epoxy resin [A] for the present invention because it can produce a cured resin with well-balanced mechanical characteristics including heat resistance and elastic modulus. Accordingly, in the present invention, it is preferable that epoxy resin [A] contains a polyfunctional amine type epoxy resin. It is preferable that such polyfunctional amine type epoxy resins account for 40 to 70 mass % of the total epoxy resin quantity.

Difunctional amine type epoxy resins are used preferably as epoxy resin [A] for the present invention because the viscosity of a resin composition can be kept low and the elastic modulus of a cured resin can be increased. It is preferable that such difunctional amine type epoxy resins account for 15 to 40 mass % of the total epoxy resin quantity. The use of such a difunctional amine type epoxy resin in combination with a polyfunctional amine type epoxy resin is preferable because the balance of the viscosity, heat resistance and mechanical characteristics can be improved.

Epoxy resin [A] to be used for the present invention may contain a copolymer of an epoxy resin and a thermosetting resin. Examples of the aforementioned thermosetting resin to be copolymerized with an epoxy resin include, for instance, unsaturated polyester resin, vinyl ester resin, epoxy resin, benzoxazine resin, phenol resin, urea resin, melamine resin, and polyimide resin. These resin compositions and compounds may be used singly or in combination.

For the epoxy resin composition of the present invention, epoxy resin [A] other than glycidyl amine can be used in order to improve operability by adjusting the viscoelasticity of the resin composition in an uncured state, or to improve the elastic modulus and heat resistance of a cured resin. Such epoxy resins may be added singly or in combination of two or more thereof. Examples of Such epoxy resins include bisphenol A type epoxy resin, bisphenol F type epoxy resin, bisphenol S type epoxy resin, naphthalene type epoxy resin, fluorene type epoxy resin, biphenyl type epoxy resin, urethane modified epoxy resin, hydantoin type epoxy resin, resorcinol type epoxy resin, isocyanurate type epoxy resin, tris-hydroxyphenylmethane type epoxy resin, tetraphenylolethane type epoxy resin, phenol novolac type epoxy resin, ortho-cresol novolac type epoxy resin, phenol aralkyl type epoxy resin, dicyclopentadiene type epoxy resin, and aliphatic epoxy resin.

Among them, glycidyl ethers produced from a phenol as a precursor are preferably used. Preferably, liquid bisphenol A type epoxy resin, bisphenol F type epoxy resin and resorcinol type epoxy resin are used in combination with other epoxy resin because they have low viscosity.

As compared to liquid bisphenol A type epoxy resin, solid bisphenol A type epoxy resin provides a structure having higher toughness although it gives a structure having lower crosslinking density, resulting in reduced heat resistance. Therefore, solid bisphenol A type epoxy resin is used in combination with glycidyl amine type epoxy resin, or liquid bisphenol A type epoxy resin or bisphenol F type epoxy resin.

Epoxy resin having a naphthalene skeleton provides a cured resin having a low water absorption percentage and high heat resistance. Biphenyl type epoxy resin, dicyclopentadiene type epoxy resin, phenol aralkyl type epoxy resin and diphenyl fluorene type epoxy resin are also suitably used because they provide a cured resin having a low water absorption percentage. Urethane modified epoxy resin and isocyanate modified epoxy resin provide a cured resin having high fracture toughness and elongation.

Commercial products of bisphenol A type epoxy resin include "EPON (registered trademark)" 825 (supplied by Mitsubishi Chemical Corporation), "EPICLON (registered trademark)" 850 (supplied by DIC Corporation), "Epotohto (registered trademark)" YD-128 (supplied by NIPPON STEEL & SUMIKIN CHEMICAL CO., LTD.), and DER-331 and DER-332 (each supplied by The DOW Chemical Company).

Commercial products of bisphenol F type epoxy resin include "jER (registered trademark)" 806, "jER (registered trademark)" 807 and "jER (registered trademark)" 1750 (each supplied by Mitsubishi Chemical Corporation), "EPICLON (registered trademark)" 830 (supplied by DIC Corporation), and "Epotohto (registered trademark)" YD-170 (supplied by NIPPON STEEL & SUMIKIN CHEMICAL CO., LTD.).

Commercial products of bisphenol F type epoxy resin include "EPICLON (registered trademark)" EXA-1514 (supplied by DIC Corporation).

Commercial products of naphthalene type epoxy resin include "EPICLON (registered trademark)" HP 4032 (supplied by DIC Corporation), and NC-7000 and NC-7300 (each supplied by Nippon Kayaku Co., Ltd.).

Commercial products of fluorene type epoxy resin include "ESF (registered trademark)" 300 (supplied by NIPPON STEEL & SUMIKIN CHEMICAL CO., LTD.), and "ONCOAT (registered trademark" EX-1010 (supplied by Nagase ChemteX Corporation).

Commercial products of biphenyl type epoxy resin include YX 4000 (supplied by Mitsubishi Chemical Corporation).

Commercial products of urethane modified epoxy resin include AER 4152 (supplied by Asahi Kasei E-materials Corporation).

Commercial products of hydantoin type epoxy resin include AY 238 (supplied by Huntsman Advanced Materials K.K.).

Commercial products of resorcinol type epoxy resin include "DENACOL (registered trademark)" EX-201 (supplied by Nagase ChemteX Corporation).

Commercial products of isocyanurate type epoxy resin include TEPIC-P (supplied by Nissan Chemical Industries, Limited).

Commercial products of tris-hydroxyphenylmethane type epoxy resin include Tactix 742 (supplied by Huntsman Advanced Materials K.K.).

Commercial products of tetraphenylolethane type epoxy resin include "jER (registered trademark)" 1031S (supplied by Mitsubishi Chemical Corporation).

Commercial products of phenol novolac type epoxy resin include DEN 431 and DEN 438 (each supplied by DOW Chemical Company), and "jER (registered trademark)" 152 (supplied by Mitsubishi Chemical Corporation).

Commercial products of ortho-cresol novolac type epoxy resin include EOCN-1020 (supplied by Nippon Kayaku Co., Ltd.), and "EPICLON (registered trademark)" N-660 (supplied by DIC Corporation).

Commercial products of phenol aralkyl type epoxy resin include NC-3000 (supplied by Nippon Kayaku Co., Ltd.)

Commercial products of dicyclopentadiene type epoxy resin include "EPICLON (registered trademark)" HP 7200 (supplied by DIC Corporation).

Commercial products of aliphatic epoxy resin include "DENACOL (registered trademark)" EX-810, EX-212 and EX-611 (each supplied by Nagase ChemteX Corporation).

Further, in the present invention, a compound having one epoxy group in one molecule can also be used for improving the balance of the elastic modulus and elongation of a cured resin. Commercial products of the compound having one epoxy group in one molecule include "Denacol (registered trademark)" Ex-731 (glycidylphthalimide, supplied by Nagase ChemteX Corporation), OPP-G (o-phenyl phenylglycidyl ether, supplied by SANKO CO., LTD.), Ex-141 (phenylglycidyl ether, supplied by Nagase ChemteX Corporation), and Ex-146 (tert-butyl phenylglycidyl ether, supplied by Nagase ChemteX Corporation).

Composite polyamide fine particles [B] to be used in the present invention satisfy the following requirements (b1) to (b3):

(b1) the materials that form the particles are polyamide (B1) and thermoplastic elastomer resin (B2);
(b2) the melting point or glass transition temperature of polyamide (B1) is higher than 100° C.; and
(b3) the particle diameter is 0.1 to 100 μm.

Composite polyamide fine particles [B] in the present invention are formed from polyamide (B1) and thermoplastic elastomer resin (B2) as materials thereof.

Examples of polyamide (B1) that forms composite polyamide fine particles in the present invention include polyamide compounds that can be produced through condensation polymerization of lactams having a 3- or more-membered ring, polymerizable aminocarboxylic acids, dibasic acids, diamines, salts thereof, or mixtures thereof.

Examples of such polyamides include polycaproamide (nylon 6), polyhexamethylene adipamide (nylon 66), polypentamethylene adipamide (nylon 56), polytetramethylene sebacamide (nylon 410), polypentamethylene sebacamide (nylon 510), polyhexamethylene sebacamide (nylon 610), polydecamethylene sebacamide (nylon 1010), polyundecamide (nylon 11), polydodecamide (nylon 12), polypentamethylene terephthalamide (nylon 5T), polyhexamethylene terephthalamide (nylon 6T), polydecamethylene terephthalamide (nylon 10T), copolymers of 4,4'-diaminodicyclohexylmethane and dodecanedioic acid (for instance, "TROGAMID (registered trademark)" CX 7323, supplied by Daicel-Evonik Ltd.), copolymers of 3,3'-dimethyl-4,4'-diaminodicyclohexyl methane, isophthalic acid and 12-aminododecanoic acid (for instance, "Grilamid (registered trademark)" TR55, supplied by EMS-CHEMIE (Japan) Ltd.), copolymers of 3,3'-dimethyl-4,4'-diaminodicyclohexyl methane and dodecanedioic acid (for instance, "Grilamid (registered trademark)" TR90, supplied by EMS-CHEMIE (Japan) Ltd.), and mixtures of a copolymer of 3,3'-dimethyl-4,4'-diaminodicyclohexyl methane, isophthalic acid and 12-aminododecanoic acid and a copolymer of 3,3'-dimethyl-4,4'-diaminodicyclohexyl methane and dodecanedioic acid (for instance, "Grilamid (registered trademark)" TR70LX, supplied by EMS-CHEMIE (Japan) Ltd.).

Examples of thermoplastic elastomer resin (B2) that forms composite polyamide fine particles in the present invention include polyamide elastomers and polyester elastomers.

Polyamide elastomers include block copolymers produced by copolycondensation of a polyamide block having a reactive carboxyl terminal group and a polyether block having a reactive terminal group of polyether polyol (polyether diol).

The polyamide elastomers that can be used include block copolymers having as a hard segment an aliphatic, cycloaliphatic or aromatic polyamide component as shown as an example of the polyamide (B1), and having as a soft segment a component such as at least one polyalkylene ether polyol, particularly polyalkylene ether diol, preferably polyethylene glycol, polypropylene glycol, polytrimethylene glycol, polytetramethylene glycol or a mixture thereof.

These polyamide elastomers may be commercial products, and examples thereof may include "Pebax (registered trademark)" 33, 13, 31 and 11 Series (supplied by Arkema, Ltd.), "VESTAMIDE (registered trademark)" E Series (supplied by Daicel-Evonik Ltd.), and "UBESTA (registered trademark)" XPA (supplied by Ube Industries, Ltd.).

These polyamide elastomer may be blended with other components, for example a pigment, a dispersant, an antioxidant, an ultraviolet absorber, an ultraviolet stabilizer, a plasticizer, an inorganic filler (zinc oxide, barium sulfate, titanium dioxide or the like) and so on as desired.

Polyester elastomers include block copolymers produced by copolycondensation of a polyester block having a reactive carboxyl terminal group and a polyether block having a reactive terminal group of polyether polyol (polyether diol).

The polyester elastomers may be block copolymers having as a hard segment a component such as polyethylene terephthalate, polypropylene terephthalate, polybutylene terephthalate, polycyclohexanedimethylene terephthalate, polyhexylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene teerphthalate/naphthalate, polybutylene terephthalate/decane dicarboxylate, polyethylene terephthalate/cyclohexanedimethylene terephthalate), a polyether ester (polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, etc.), polyethylene terephthalate/succinate, polypropylene terephthalate/succinate, polybutylene terephthalate/succinate, polyethylene terephthalate adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, polybutylene terephthalate/isophthalate/sebacate, bisphenol A/terephthalic acid, bisphenol A/isophthalic acid, bisphenol A/terephthalic acid/isophthalic acid, polyglycolic acid, polylactic acid, poly(3-hydroxybutanoic acid), poly(3-hydroxyvaleric acid), polybutyrolactone or polycaprolactone, and having as a soft segment a component such as a polyalkylene ether polyol, particularly a polyalkylene ether diol, preferably polyethylene glycol, polypropylene glycol, polytrimethylene glycol, polytetramethylene glycol or a mixture thereof.

Polyether esters that are thermoplastic resins having an ether bond are preferably used, and as these polyether esters, those so called polyester elastomers commercially available as, for example, "Hytrel (registered trademark)" (supplied by DU PONT-TORAY CO., LTD. or supplied by du Pont de Nemours and Company) can be used.

The molecular weight of each of polyamide (B1) and thermoplastic elastomer resin (B2) is preferably in the range of 1,000 to 10,000,000 in terms of a weight average molecular weight. The upper limit of the molecular weight is more preferably 1,000,000 or less, further preferably 500,000 or less, especially preferably 100,000 or less. The lower limit of the molecular weight is more preferably 1,000 or more, further preferably 5,000 or more, especially preferably 10,000 or more. As long as the molecular weight is in the above-mentioned range, fine particles can be easily formed.

The weight average molecular weight as referred to herein is a weight average molecular weight measured by gel permeation chromatography (GPC) using dimethyl formamide as a solvent, and calculated in terms of polystyrene.

In the case where the measurement cannot be made with dimethyl formamide, tetrahydrofuran is used. In the case where the measurement cannot be made with tetrahydrofuran, hexafluoroisopropyl alcohol is used. In the case where the measurement cannot be made with hexafluoroisopropyl alcohol, 2-chloronaphthalene is used.

Composite polyamide fine particles [B] according to the embodiment of the present invention (hereinafter, occasionally referred to as "resin fine particles" or "resin particles") are formed of polyamide (B1) and thermoplastic elastomer resin (B2). In the present invention, it is preferable that composite polyamide fine particles [B] have a dispersion structure in which a plurality of domains mainly composed of thermoplastic elastomer resin (B2) are dispersed in a matrix mainly composed of polyamide (B1). Particularly, as a preferable aspect, composite polyamide fine particles have a sea-island structure, i.e. a dispersion structure in which a plurality of particulate domains mainly composed of thermoplastic elastomer resin (B2) are dispersed in a matrix mainly composed of polyamide (B1). When composite polyamide fine particles have a sea-island structure in which a plurality of domains are dispersed, impact can be absorbed in independent island phases while the particle shape is maintained in a continuous sea phase, so that both impact absorption and mechanical structural characteristics can be secured.

Whether the phases in such a sea-island structure are mainly composed of polyamide (B1) or thermoplastic elastomer resin (B2) can be determined by analyzing the cross section of the composite polyamide fine particle [B] or a cured resin or fiber-reinforced composite material containing composite polyamide fine particles [B] using a known method such as a chemical composition mapping method such as microscopic IR, SEM-EDX, TEM-EDX or TEM-EELS, or a viscoelasticity mapping method such as VE-AFM.

In the present invention, the content of polyamide (B1) in the matrix is preferably 50 mass % or more. The content of thermoplastic elastomer resin (B2) in the domain is preferably 50 mass % or more.

Here, the particulate shape is a spherical shape, an elliptical shape, a red blood cell-like shape, a shape of a granular matter in which spherical or elliptical particles are aggregated, or an unstructured debris shape or a shape of a granular matter thereof.

This domain is required to exist at least in composite polyamide fine particles, and may further exist on the surfaces of particles.

Existence of a dispersion structure can be confirmed in the following manner: a resin fine particle is embedded in an epoxy resin for an electron microscope, cured, and then frozen and cut to a thickness of 0.1 μm, and the cross section of the particle is observed using a transmission electron microscope (e.g. H-7100 supplied by Hitachi, Ltd.).

In the method for observing the phase structure (dispersion structure) with an electron microscope, a pretreatment may be performed using various kinds of stains for clearly observing the phase structure.

The average particle diameter of the domains is preferably 50 μm or less, more preferably 30 μm or less, further preferably 10 μm or less, particularly preferably 5 μm or less, especially preferably 1 μm or less for exhibiting the effect of improving toughness and impact resistance by formation of a sea-island structure. The lower limit thereof is preferably 0.05 μm. When the average particle diameter of domains falls out of the above-mentioned range, the aforementioned improvement effect may be low, or not achieved.

At this time, the average particle diameter of domains is preferably less than or equal to ⅓ of the particle diameter of composite polyamide fine particles. Particularly, the average particle diameter of domains is less than or equal to preferably ¼, more preferably ⅕, further preferably ⅛, especially preferably 1/10 of the particle diameter of composite polyamide fine particles. The lower limit thereof is preferably 1/2000 of the particle diameter of composite polyamide fine particles.

In the embodiment of the present invention, various kinds of known compatibilizers can be used for controlling the average particle diameter of domains.

Here, compatibilizers include block copolymers, graft copolymers and random copolymers that are preferably used for reducing free energy at the interface between separated phases to facilitate control of the average particle diameter of domains and the distance between domains in a dispersion structure.

The average particle diameter of domains is calculated in accordance with the following method.

<Average Particle Diameter of Domains>

Similarly to the method described above, a resin fine particle is embedded in an epoxy resin for an electron microscope, cured, and then frozen and cut to a thickness of 0.1 μm, and the cross section of the particle is observed using a transmission electron microscope (e.g. H-7100 supplied by Hitachi, Ltd.). The cross-sectional areas of 50 domains randomly selected in the thus-obtained transmission electron microscope photograph are each measured, and converted into a diameter of a perfect circle with an area equal to that of the domain in accordance with the following numeric conversion equation, the thus-obtained values are averaged, and the thus-obtained average value is defined as an average particle diameter of domains. In the case where the number of domains existing in one particle is 50 or less, 50 domains are randomly selected in a plurality of photographs of cross sections of particles, and measured.

$$D_{domain} = \frac{\sum_{i=1}^{n} \sqrt{4Si/\pi}}{n} \qquad [\text{Formula 1}]$$

Here, $D_{domain}$ denotes the average particle diameter of domains, Si denotes the cross-sectional area of each domain, and n denotes the number of measurements (50).

In the case where it is difficult to make a measurement by the above-mentioned method, the average particle diameter of domains can be determined in the following manner: a resin fine particles is dissolved in a solvent in which only polyamide (B1) as a matrix is soluble, centrifugal separation is then performed to separate a solid and a liquid, domain particles are then collected, and the average particle diameter of the domain particles is measured by a light scattering particle size analyzer. The average particle diameter as referred to herein is the volume average particle diameter.

The structure in which "a plurality of domains are dispersed" in the present invention does not include a so called core-shell structure in which one domain exists in one composite polyamide fine particle. A dispersion structure in which a plurality of domains exist, but the diameter of one domain is 20 times or more as large as the diameters of other domains is considered as substantially a core-shell structure, and is not included in the scope of the present invention.

The number of domains in one composite polyamide polyamide fine particle is at least 2, preferably 5 or more, further preferably 10 or more, more preferably 20 or more, particularly preferably 50 or more, especially preferably 100 or more, extremely preferably 150 or more. The upper limit thereof is not particularly limited as long as the inherent properties and characteristics of polyamide (B1), such as toughness, heat resistance and solvent resistance, are not deteriorated.

The average particle diameter of composite polyamide fine particles, the content of resin (B2) in the particles and the average particle diameter of domains are measured, and the number of domains in one composite polyamide polyamide fine particle is roughly estimated using the following equation.

$$N_{domain} = \frac{3V_p \times v_d}{4\pi(D_d/2)^3} \quad \text{[Formula 2]}$$

Here, $V_p = (4/3)\pi(D_p/2)^3$.

Here, $N_{domain}$ denotes the number of domains, Vp denotes the average volume of composite polyamide fine particles, Dp denotes the average particle diameter of composite polyamide fine particles, vd denotes the volume fraction of thermoplastic elastomer resin (B2), and Dd is the average particle diameter of domains.

The content of thermoplastic elastomer resin (B2) in composite polyamide fine particles is normally 50 volume % or less in resin fine particles, but it is preferably 40 volume % or less for effectively exhibiting the properties and characteristics of polyamide (B1) and thermoplastic elastomer resin (B2). The content of thermoplastic elastomer resin (B2) in composite polyamide fine particles is more preferably 35 volume % or less, more preferably 30 volume % or less. The lower limit thereof is preferably 0.1 volume % or more, more preferably 1 volume % or more, further preferably 5 volume % or more, especially preferably 10 volume % or more. When the content of thermoplastic elastomer resin (B2) in composite polyamide fine particles is less than 0.1 volume %, an effect of improving the properties and characteristics of polyamide (B1) particles by the dispersion structure may not be obtained.

The content of thermoplastic elastomer resin (B2) is determined by the following method.

The areas of the matrix part and the domain part is measured in the photograph of the cross section of the particle, and the ratio of the areas is converted into a volume ratio to roughly estimate the content of thermoplastic elastomer resin (B2).

The content of thermoplastic elastomer resin (B2) may be determined in the following manner: only a soluble component is extracted from composite resin fine particles with a solvent in which any one of polyamide (B1) and thermoplastic elastomer resin (B2), and residues are weighed.

Alternatively, the content of thermoplastic elastomer resin (B2) may be determined in the following manner: the obtained resin fine particles are subjected to $^1$H-NMR (JNM-AL400 supplied by JEOL Ltd.) measurement using deuterated dimethyl formamide, and the composition ratio of polyamide (B1) and thermoplastic elastomer resin (B2) is determined.

In the case where the measurement cannot be made with deuterated dimethyl formamide, deuterated tetrahydrofuran is used. In the case where the measurement cannot be made with deuterated tetrahydrofuran, deuterated hexafluoroisopropyl alcohol is used. In the case where the measurement cannot be made with deuterated hexafluoroisopropyl alcohol, deuterated formic acid is used.

Further, in the case where polyamide (B1) and thermoplastic elastomer resin (B2) show mutually different melting peaks in differential scanning calorimetry (DSC), the content of thermoplastic elastomer resin (B2) by a calibration curve method using DSC. Specifically, first, several samples with polyamide (B1) and thermoplastic elastomer resin (B2) mixed in different ratios are provided, and a calibration curve is prepared from the area ratio relationship between the melting peaks of polyamide (B1) and thermoplastic elastomer resin (B2) on a DSC curve obtained in DSC measurement of the samples. Subsequently, composite polyamide fine particles are measured using DSC, and the content of thermoplastic elastomer resin (B2) is determined from the area ratio of peaks corresponding to the melting peaks of polyamide (B1) and thermoplastic elastomer resin (B2).

The absolute value of a difference between the solubility parameters (hereinafter, referred to as a SP value) of polyamide (B1) and thermoplastic elastomer resin (B2) is preferably 0.1 $(J/cm^3)^{1/2}$ or more for producing composite polyamide fine particles having a dispersion structure in which a plurality of domains mainly composed of thermoplastic elastomer resin (B2) are dispersed in a matrix mainly composed of polyamide (B1) in the embodiment of the present invention. That is, in the present invention, it is preferable that the relationship of $|\delta_{B1}-\delta_{B2}|\geq 0.1\ [(J/cm^3)^{1/2}]$ is satisfied where the solubility parameters of polyamide (B1) and thermoplastic elastomer resin (B2) are $\delta_{B1}$ and $\delta_{B2}$, respectively. When the absolute value of a difference both the parameters is less than 0.1 $(J/cm^3)^{1/2}$, the size of domains formed may be too small to obtain the effect of the dispersion structure. The upper limit of the absolute value of a difference between both the SP values is not particularly limited as long as a dispersion structure is obtained, but it is preferably 20 $(J/cm^3)^{1/2}$ or less, more preferably 15 $(J/cm^3)^{1/2}$ or less, further preferably 10 $(J/cm^3)^{1/2}$ or less.

The SP value as referred to herein is the value described in pages 688 to 701 in "Polymer Handbook Fourth Edition", written by J. Brand, published from Wiley Ltd. in 1998.

For values that are not described therein, calculation is performed on the basis of the Fedor's estimation method. This calculation is performed based on the cohesive energy density and the molar molecular volume (hereinafter, occasionally referred to as a solvent SP value calculation method) ("SP value: Foundation/Application and Calculation Method", written by Hideki YAMAMOTO, published from JOHOKIKO CO., LTD in Mar. 31, 2005. The SP value of a copolymer of products each obtained by magnifying the SP value of each constituent unit by the molar fraction of the constituent unit.

The average particle diameter of composite polyamide fine particles in the embodiment of the present invention is preferably in the range of 0.1 to 100 μm for imparting toughness, impact resistance and so on when the composite polyamide fine particles are added to epoxy resin etc. The upper limit of the average particle diameter is more preferably 80 μm or less, further preferably 50 μm or less, especially preferably 30 μm or less. The lower limit of the average particle diameter is more preferably 0.1 μm or more, further preferably 0.5 μm or more, especially preferably 1 μm or more, remarkably preferably more than 1 μm. As long as the average particle diameter is in the above-mentioned range, a sufficient effect as a modifier is exhibited.

The particle diameter distribution index of composite polyamide fine particles [B] is 3.0 or less, 2.0 or less in a preferred embodiment, 1.5 or less in a more preferred embodiment, 1.2 or less in an especially preferred embodiment, and 1.1 or less in the most preferred embodiment. The lower limit is theoretically 1.0. It is known that characteristics such as interlaminar toughness in a fiber-reinforced material are significantly influenced by the interlayer thickness, and for controlling the interlayer thickness with high accuracy, the particle diameter distribution index is advantageously and preferably small.

The interlayer thickness is preferably in the range of 25 to 60 μm, more preferably in the range of 30 to 45 μm, depending on the structure and shape of the fiber-reinforced composite material. The interlayer thickness can be measured by, for instance, the following procedure. A specimen of a fiber-reinforced composite material is cut in a direction perpendicular to the carbon fiber, and the cross section is polished and photographed with an optical microscope at a magnification of 200 or more. In an appropriately-selected region between fiber layers in the photograph, a line parallel to the carbon fiber layers is drawn so that it represents a carbon fiber volume content of 50%, and it is assumed to be a boundary line between the internal region of the fiber layer and the interlayer region between the fiber layers. A boundary line averaged over a length of 100 μm is drawn, and the distance between them is assumed to represent the interlayer thickness.

The average particle diameter of composite polyamide fine particles in the embodiment of the present invention can be calculated in the following manner: an epoxy resin composition containing composite polyamide fine particles is observed with a scanning electron microscope, the diameters of 100 composite polyamide fine particles randomly selected in the observed image (scanning electron microscope photograph) are measured, and the arithmetic average thereof is determined.

In the case where in the photograph, particles are not perfectly circular, but elliptical etc., the maximum diameter of a particle is defined as the particle diameter of the particle. For accurately measuring the particle diameter, the measurement is made with a magnification of 1000 or more, preferably 5000 or more.

The particle diameter distribution index is calculated by the following numeric conversion equations using the diameters of individual particles determined in the manner described above.

$$Dn = \sum_{i=1}^{n} Di/n \quad \text{[Formula 3]}$$

$$Dv = \sum_{i=1}^{n} Di^4 \bigg/ \sum_{i=1}^{n} Di^3$$

$$PDI = Dv/Dn$$

Here, Di denotes the particle diameter of a particular particle, n denotes the number of measurements (100), Dn denotes the number average particle diameter, Dv denotes the volume average particle diameter, and PDI denotes the particle diameter distribution index.

Here, the sphericity is determined in the following manner: the minor and major axes of each of 30 particles selected in the observation of particles with a scanning electron microscope are measured, and the sphericity is calculated in accordance with the following equation.

$$S = \frac{\sum_{i=1}^{n}(D_{Si}/D_{Li})}{n} \times 100 \quad \text{[Formula 4]}$$

S denotes the sphericity, $D_{Si}$ denotes the minor axis, $D_{Li}$ denotes the major axis, and n denotes the number of measurements (30).

It is preferable that the shape of the composite polyamide fine particle according to the embodiment of the present invention is close to a spherical shape because the isotropy of mechanical properties is improved when the composite polyamide fine particles are used as an additive.

The sphericity of composite polyamide fine particles [B] in the embodiment of the present invention is preferably 80 or more, more preferably 85 or more, further preferably 90 or more, especially preferably 92 or more, most preferably 95 or more. When the composite polyamide fine particles have a high sphericity as described above, the viscosity of the epoxy resin composition in which the resin particles are dispersed can be kept low, and accordingly, the content of the resin particles can be increased. A sphericity of less than 80 is not preferable because not only the isotropy is deteriorated, but also the viscosity of the epoxy resin composition increases to deteriorate fillability into the epoxy resin. Further, the content of resin particles is limited, so that interlaminar toughness becomes insufficient. The upper limit of the sphericity is 100. In the present invention, it is especially preferable that the sphericity of composite polyamide fine particles [B] is 80 or more, and the average particle diameter of the domains mainly composed of thermoplastic elastomer resin (B2) is 0.05 to 50 μm.

The minimum value in the (minor axis/major axis) values of individual particles in the above equation is preferably 0.7 or more. The above-mentioned minimum value is more preferably 0.75 or more, further preferably 0.8 or more, especially preferably 0.85 or more. It is not preferable that the above-mentioned minimum value is less than 0.7 from the viewpoint of the homogeneity of the whole material. The upper limit of the above-mentioned minimum value is 1.

The melting point or glass transition temperature of polyamide (B1) of composite polyamide fine particles [B] in the present invention is higher than 100° C.

The melting point or glass transition temperature of polyamide (B1) of composite polyamide fine particles [B] is preferably 110° C. or higher, more preferably 120° C. or higher, further preferably 130° C. or higher, especially preferably 140° C. or higher, remarkably preferably 150° C. or higher. The upper limit thereof is not particularly limited, but it should be 300° C. or lower in view of the nature of a general polyamide. Such a high melting point or glass transition temperature ensures that resin particles will not suffer from deformation during heat-curing and that a stable interlayer thickness will be achieved, making it possible to obtain a fiber-reinforced composite material that has high interlaminar toughness and maintains a compressive strength stably under wet heat conditions. When the melting point or glass transition temperature of the polyamide is 100° C. or lower, the resulting fiber-reinforced composite material will fail to have a well-balanced combination of an interlaminar toughness and a compressive strength under wet heat conditions. If the glass transition temperature or melting point is higher than 300° C., on the other hand, the resin particles themselves tend to be low in toughness and interface adhesion between the resin particles and the matrix resin tends to be insufficient, resulting in a fiber-reinforced composite material with insufficient interlaminar toughness.

The melting point or glass transition temperature of polyamide (B1) is observed when determined by performing differential scanning calorimetry (DSC) as follows: a specimen is heated at a heating rate of 20° C./min from 30° C. to a temperature 30° C. or more higher than an expected glass transition temperature, maintained at the temperature for 1 min, once cooled at a cooling rate of 20° C./min down to 0° C., maintained at the temperature for 1 min, and then heated again at a heating rate of 20° C./min.

Further, the use of composite polyamide fine particles [B] satisfying all the requirements (b1) to (b3) ensures that composite polyamide fine particles provide a composite material with high heat resistance while maintaining a structure in fiber interlayer regions regardless of fiber-reinforced composite material molding conditions, and also, a new fiber-reinforced composite material having high Mode I interlaminar toughness can be produced owing to the effect of the thermoplastic elastomer resin.

Other resin can be mixed with composite polyamide fine particles [B] in the present invention as long as the effect thereof is not impaired. The other resin that can be mixed is not particularly limited, and specific examples thereof include thermoplastic resins including vinyl polymer, polyester, polyamide, polyarylene ether, polyarylene sulfide, polyethersulfone, polysulfone, polyether ketone, polyether ether ketone, polyurethane, polycarbonate, polyamide-imide, polyimide, polyetherimide, polyacetal, silicone, and copolymers thereof; and thermosetting resins including epoxy resin, benzoxazine resin, vinyl ester resin, unsaturated polyester resin, urethane resin, phenol resin, melamine resin, maleimide resin, cyanate ester resin, and urea resin. These resins can be used singly or in combination.

The method for producing composite polyamide fine particles in the present invention is not particularly limited as long as the above-mentioned structure is obtained, and examples thereof include a spray drying method, an emulsion polymerization method, a forced melting/kneading method, a mechanical grinding method, a phase-transfer emulsification method, and a method using an emulsion while taking advantage of a phase separation phenomenon of a polymer solution as described in International Publication No. WO 2009/142231 and International Publication No. WO 2012/043509. In particular, the phase-transfer emulsification method, the method using an emulsion while taking advantage of a phase separation phenomenon of a polymer solution.

The epoxy resin composition according to the present invention is used in combination with curing agent [C]. A curing agent as described herein is a curing agent suitable for the epoxy resin contained in the epoxy resin composition in the present invention, and it is a compound having an active group that can react with the epoxy group. Specifically, examples of the curing agent include, for instance dicyandiamide, aromatic polyamine, aminobenzoic acid ester, various acid anhydrides, phenol novolac resin, cresol novolac resin, polyphenol compounds, imidazole derivatives, aliphatic amines, tetramethyl guanidine, thiourea-added amine, methylhexahydrophthalic anhydride, other carboxylic anhydrides, carboxylic-acid hydrazide, carboxylic acid amide, polymercaptan, boron trifluoride-ethylamine complex, and other Lewis acid complexes.

Particularly, the use of aromatic polyamine as the curing agent makes it possible to produce a cured product with high heat resistance. Therefore, in the present invention, curing agent [C] is preferably an aromatic polyamine. In particular, of the various aromatic polyamine compounds, diaminodiphenyl sulfone, derivatives thereof, and various isomers thereof are the most suitable curing agents to produce a cured product with high heat resistance.

Furthermore, if a combination of dicyandiamide and a urea compound such as 3,4-dichlorophenyl-1,1-dimethylurea, or an imidazole is used as the curing agent, a high heat resistance and water resistance can be achieved even when curing is performed at a relatively low temperature. The use of an acid anhydride to cure an epoxy resin provides a cured material that has a lower water absorption percentage compared to curing with an amine compound. Other good curing agents include the above ones in latent forms such as microencapsulated ones, which serve to provide prepregs with high storage stability that will not suffer from significant changes particularly in tackiness and drape property even if left to stand at room temperature.

The optimum value of the added amount of the curing agent varies depending on the types of epoxy resin and curing agent, and in the case of an aromatic amine curing agent, for instance, it is preferable to add it so that it will be stoichiometrically equivalent. However, a resin with a higher elastic modulus compared to the case of equivalency may be obtained when using an epoxy resin and an aromatic amine curing agent in such a manner that the ratio of the quantity of active hydrogen in the latter to the quantity of the epoxy group in the former is about 0.7 to 0.9, and this is also a preferable embodiment. These curing agents may be used singly, or a plurality thereof may be used in combination.

Commercial products of aromatic polyamines include Seikacure S (supplied by Wakayama Seika Kogyo Co., Ltd.), MDA-220 (supplied by Mitsui Chemicals, Inc.), "jER Cure (registered trademark)" W (supplied by Mitsubishi Chemical Corporation), 3,3'-DAS (supplied by Mitsui Chemicals, Inc.), "Lonzacure (registered trademark)" M-DEA (supplied by Lonza), "Lonzacure (registered trademark)" M-DIPA (supplied by Lonza), "Lonzacure (registered trademark)" M-MIPA (supplied by Lonza), and "Lonzacure (registered trademark)" DETDA 80 (supplied by Lonza).

A composition to be used may contain these epoxy resins and curing agents, part of which may be subjected to preliminary reaction in advance. In some cases, this method can serve effectively for viscosity adjustment and storage stability improvement.

In the present invention, a thermoplastic resin other than constituent [B] can be mixed with or dissolved in the epoxy resin composition. Generally, such a thermoplastic resin is preferably a thermoplastic resin having on the main chain a bond selected from the group consisting of a carbon-carbon bond, an amide bond, an imide bond, an ester bond, an ether bond, a carbonate bond, a urethane bond, a thioether bond, a sulfone bond and a carbonyl bond. The thermoplastic resin may partially have a crosslinked structure, and may be crystalline or noncrystalline. In particular, it is preferred that at least one resin selected from the group consisting of polyamide, polycarbonate, polyacetal, polyphenylene oxide, polyphenylene sulfide, polyarylate, polyester, polyamide-imide, polyimide, polyether imide, polyimide having a phenyltrimethylindane structure, polysulfone, polyether sulfone, polyether ketone, polyether ether ketone, polyaramide, polyether nitrile and polybenzimidazole is mixed with or dissolved in any epoxy resin contained in the epoxy resin composition.

Particularly, for achieving high heat resistance, the glass transition temperature (Tg) of the thermoplastic resin is 150° C. or higher, preferably 170° C. or higher. When the glass transition temperature of a thermoplastic resin to be blended is lower than 150° C., a molded product produced using the thermoplastic resin may be easily deformed by heat. Further, as the terminal functional group of the thermoplastic resin, a hydroxyl group, a carboxyl group, a thiol group, an acid anhydride or the like is preferably used because it can react with a cation-polymerizable compound. Specifically, such thermoplastic resins that can be used include commercial products of polyether sulfone such as "SUMIKAEXCEL (registered trademark)" PES3600P, "SUMIKAEXCEL (registered trademark)" PES5003P, "SUMIKAEXCEL (registered trademark)" PES5200P and "SUMIKAEXCEL (registered trademark)" PES7600P (each supplied by Sumitomo Chemical Company, Limited); "Ultrason (registered trademark)" E2020P and "Ultrason (registered trademark)" E2021SR (each supplied by BASF SE); "GAFONE (registered trademark)" 3600RP and "GAFONE (registered trademark)" 3000RP (each supplied by Solvay Specialty Polymers K.K.); copolymer oligomers of polyether sulfone and polyether ether sulfone as described in Published Japanese Translation of PCT International Application Publication No. JP-T-2004-506789; and commercial products of polyether imide such as "ULTEM (registered trademark)" 1000, "ULTEM (registered trademark)" 1010 and "ULTEM (registered trademark) 1040 (each supplied by Solvay Specialty Polymers K.K.). The oligomer is a relatively low-molecular-weight polymer in which a finite number of monomers, e.g. about 10 to 100 monomers, are bonded together.

A mixture of epoxy resin and thermoplastic resin often gives abetter result as compared to the case where these resins are used singly. Fragility of epoxy resin is covered by toughness of thermoplastic resin, and difficulty in molding of thermoplastic resin is covered by epoxy resin, resulting in well balanced base resin. The use ratio of epoxy resin and thermoplastic resin other than constituent [B] is such that the blending amount of thermoplastic resin is preferably in the range of 2 to 40 parts by mass, more preferably 5 to 30 parts by mass based on total amount, or 100 parts by mass, of blended epoxy resin from the viewpoint of balance.

For the epoxy resin composition according to the present invention, it is preferable that constituents (components) other than curing agent [C] are first homogeneously heated and kneaded at a temperature of about 150 to 170° C., and then cooled to a temperature of about 60° C., curing agent [C] is then added, and the mixture is kneaded, but the method for blending the components is not limited to this method.

The epoxy resin composition according to the present invention may contain a coupling agent, thermosetting resin particles, or inorganic fillers such as silica gel, carbon black, clay, carbon nanotube, and metal powder, unless they impair the advantageous effect of the invention.

The prepreg according to the present invention is produced by impregnating reinforcement fiber with an epoxy resin composition as described above. Reinforcement fibers that can be used for the prepreg according to the present invention include carbon fiber, glass fiber, aramid fiber, boron fiber, polypara-phenylenebenzo-bis-oxazole (PBO) fiber, high-strength polyethylene fiber, alumina fiber, and silicon carbide fiber. Two or more of these fibers may be used as a mixture. There are no specific limitations on the form and way of alignment of the reinforcement fibers, and useful fiber structures include, for instance, long fibers paralleled in one direction, single tow, woven fabric, knit fabric, nonwoven fabric, mat, and braid.

With a high specific modulus and specific strength, carbon fiber can be used effectively, particularly when it is necessary to produce lightweight or high-strength materials. Therefore, in the present invention, reinforcement fibers are preferably carbon fibers.

With respect to carbon fiber used favorably for the present invention, virtually any appropriate type of carbon fiber can be adopted for specific uses, but it is preferable that the carbon fiber to be used has a tensile modulus not more than 400 GPa from the viewpoint of interlaminar toughness and impact resistance. From the viewpoint of strength, carbon fiber with a tensile strength of 4.4 to 6.5 GPa is used preferably because a composite material with high rigidity and mechanical strength can be produced. Tensile elongation is also an important factor, and it is preferable that the carbon fiber have a high strength and a high elongation percentage of 1.7 to 2.3%. The most suitable carbon fiber will simultaneously exhibit various characteristics including a tensile modulus of at least 230 GPa, tensile strength of at least 4.4 GPa, and tensile elongation of at least 1.7%.

Commercial products of carbon fibers include "Torayca (registered trademark)" T800G-24K, "Torayca (registered trademark)" T800S-24K, "Torayca (registered trademark)" T700G-24K, "Torayca (registered trademark)" T300-3K, and "Torayca (registered trademark)" T700S-12K (all supplied by Toray Industries, Inc.).

With respect to the form and way of alignment of carbon fibers, long fibers paralleled in one direction, woven fabric, or others may be selected appropriately, but if a carbon fiber-reinforced composite material that is lightweight and relatively highly durable is to be obtained, it is preferable to use carbon fibers in the form of long fibers (fiber bundles) paralleled in one direction, woven fabric, or other continuous fibers.

Carbon fiber bundles to be used for the present invention preferably have a monofilament fineness of 0.2 to 2.0 dtex, more preferably 0.4 to 1.8 dtex. If the monofilament fineness is less than 0.2 dtex, carbon fiber bundles may be damaged easily due to contact with guide rollers during twining, and similar damage may take place during an impregnation step for the resin composition. If the monofilament fineness is more than 2.0 dtex, the resin composition may fail to impregnate carbon fiber bundles sufficiently, possibly resulting in a decrease in fatigue resistance.

The carbon fiber bundles to be used for the present invention preferably contain 2,500 to 50,000 filaments per fiber bundle. If the number of filaments is less than 2,500, the fibers may be easily caused to meander, leading to a decrease in strength. If the number of filaments is more than 50,000, resin impregnation may be difficult during prepreg preparation or during molding. The number of filaments is more preferably in the range of 2,800 to 40,000.

It is preferable that the prepreg according to the present invention be in the form of carbon fiber impregnated with an epoxy resin composition, and the mass fraction of the carbon fiber in the prepreg is preferably 40 to 90 mass %, more preferably 50 to 80 mass %. If the mass fraction of the carbon fiber is too small, the resulting composite material will be too heavy and the advantage of the fiber-reinforced composite material having high specific strength and specific modulus will be impaired in some cases, while if the mass fraction of carbon fiber is too large, impregnation with the resin composition will not be achieved sufficiently and the resulting composite material will suffer from many voids, possibly leading to large deterioration in mechanical characteristics.

In the prepreg according to the present invention, composite polyamide fine particles [B] are distributed in a higher concentration on the surface of the prepreg than at the inside of the prepreg.

That is, the prepreg according to the present invention preferably has a structure in which a particle-rich layer, that is, a layer in which localized existence of the aforementioned resin particles [B] is clearly confirmed in observed cross sections (hereinafter, occasionally referred to as a "particle layer") is formed near the surface of the prepreg.

More preferably, 90% or more of composite polyamide fine particles [B] are localized within the depth range of 20% of the thickness of the prepreg from the surface of the prepreg.

When a carbon fiber-reinforced composite material is produced by stacking prepreg sheets and curing the epoxy resin, this structure allows resin layers to be formed easily between prepreg layers, i.e., composite material layers. Accordingly, strong adhesion and contact will be achieved between the composite material layers and the resulting carbon fiber-reinforced composite material will have high-level interlaminar toughness and impact resistance.

From this viewpoint, the aforementioned particle layer preferably exists in the depth range of 20%, more preferably 10%, of the total thickness (100%) of the prepreg, measured from the surface of the prepreg in the thickness direction.

That is, for example, when a particle layer exists in the vicinity of each of both surfaces of the prepreg, it is preferable that the prepreg has the following structure. Namely, it is preferable that given that where the thickness of the prepreg in the thickness direction of the prepreg accounts for 100%, area A exists in the depth range of 20% in the thickness direction from one surface (surface A) of the prepreg toward the inside of the prepreg, and area B exists in the depth range of 20% in the thickness direction from the other surface (surface B) toward the inside of the prepreg, the particle layer exists in each of both areas A and B. It is more preferable that area A exists in the depth range of 10% in the thickness direction from one surface (surface A) of the prepreg toward the inside of the prepreg, and area B exists in the depth range of 10% in the thickness direction from the other surface (surface B) toward the inside of the prepreg.

On the other hand, the particle layer may exist in the vicinity of only one surface of the prepreg. When the particle layer exists in the vicinity of only one surface (surface A) of the prepreg, it is preferable that the prepreg has the following structure. Namely, it is preferable that given that where the thickness of the prepreg in the thickness direction of the prepreg accounts for 100%, area A exists in the depth range of 20% in the thickness direction from one surface (surface A) of the prepreg toward the inside of the prepreg, the particle layer exists in area A. It is more preferable that area A exists in the depth range of 10% in the thickness direction from one surface (surface A) of the prepreg toward the inside of the prepreg.

The particle layer may exist only at one side as described above, but cautions are necessary because the prepreg will have two different sides. If interlayer regions containing particles and those free of particles coexist as a result of stacking of prepreg sheets in an inappropriate way by mistake, the resulting composite material will have poor interlaminar toughness. It is preferable that particle layers exist at both sides of the prepreg for allowing the prepreg to have two identical sides and making the stacking operation easy.

That is, when the particle layer exists in the vicinity of only one surface of the prepreg, the characteristics of the prepreg in the vicinity of one surface thereof are different from the characteristics of the prepreg in the vicinity of the other surface thereof (in other words, characteristics are asymmetrical with respect to the thickness direction), and therefore when two or more prepregs are to be stacked, caution should be paid to the stacking order and stacking side of the prepregs. For example, if prepregs are incorrectly stacked with the stacking order and stacking side: [prepreg 1 (vicinity of surface A (with particle layer)/central part/ vicinity of surface B (without particle layer))]//[prepreg 2 (vicinity of surface B (without particle layer)/central part/ vicinity of surface A (with particle layer))]//[prepreg 3 (vicinity of surface A (with particle layer)/central part/ vicinity of surface B (without particle layer))] although prepregs must be stacked with the stacking order and stacking side: [prepreg 1 (vicinity of surface A (with particle layer)/central part/vicinity of surface B (without particle layer))]//[prepreg 2 (vicinity of surface A (with particle layer)/central part/vicinity of surface B (without particle layer))]//[prepreg 3 (vicinity of surface A (with particle layer)/central part/vicinity of surface B (without particle layer))], no particle layer exists between prepreg 1 and prepreg 2, so that the resulting composite material may have low interlaminar (inter-prepreg) toughness. Therefore, it is preferable that the particle layer exists in the vicinity of each of both surfaces of the prepreg for preventing such a mistake (the above symbol "//" denotes the interface between prepregs).

Furthermore, the proportion of the resin particles existing in the particle layers is preferably 90 to 100 mass %, more preferably 95 to 100 mass %, of the total quantity, or 100 mass %, of the resin particles existing in the prepreg.

This proportion of existing particles can be evaluated by, for instance, the undermentioned method. Specifically, a prepreg is interposed between two polytetrafluoroethylene resin plates having smooth surfaces and brought into close contact with them, and then the temperature is increased gradually for 7 days up to a curing temperature to ensure gelation and curing, thus producing a cured prepreg plate. The cross section of the resulting cured product is observed, and the observed image (photomicrograph) is photographed. The cross-sectional photograph is used to perform evaluation in accordance with the following method. In the case of a prepreg with a particle layer existing in the vicinity of each of both surfaces of the prepreg, a line (line A), which is parallel to one surface (surface A) of the prepreg and extends over the depth range of 20% in the thickness direction from the surface (surface A) of the cured prepreg toward the inside of the prepreg, is drawn on the cross-sectional photograph. Similarly, a line (line B), which is parallel to the other surface (surface B) of the prepreg and extends over the depth range of 20% in the thickness direction from the surface (surface B) of the cured prepreg toward the inside of the prepreg, is drawn. Next, the total area (area A) of resin particles [B] existing between one surface (surface A) of the prepreg and the line A, the total area (area B) of resin particles [B] existing between the other surface (surface B) of the prepreg and the line B, and the total area (area C) of resin particles [B] existing across the thickness (total thickness) of the prepreg are determined (accordingly, area C includes area A and area B). The proportion of resin particles existing in the depth range of 20% from the surface of the prepreg to the thickness of the prepreg (100%) is calculated by dividing [area A+area B] by area C.

In the case of a prepreg with a particle layer existing in the vicinity of only one surface of the prepreg, a line (line A), which is parallel to one surface (surface A) of the prepreg and extends over the depth range of 20% in the thickness direction from the surface (surface A) of the cured prepreg toward the inside of the prepreg, is drawn on the cross-sectional photograph. Next, the total area (area A) of resin particles [B] existing between the surface (surface A) of the prepreg and the line A, and the total area (area C) of resin particles [B] existing across the total thickness of the prepreg are each determined (accordingly, area C includes area A). The proportion of resin particles [B] existing in the depth range of 20% from the surface of the prepreg to the thickness of the prepreg (100%) is calculated by dividing area A by area C. Here, the total area of the particles is determined by cutting the particle portions out of a cross-sectional photograph and converting their mass. When it is found difficult to distinguish particles dispersed in the resin in the photograph, the particles may be dyed and rephotographed.

The prepreg according to the present invention can be produced by applying methods as disclosed in Japanese Unexamined Patent Application Publication No. HEI-1-26651, Japanese Unexamined Patent Application Publication No. SHO-63-170427, or Japanese Unexamined Patent Application Publication No. SHO-63-170428.

Specifically, the prepreg according to the present invention can be produced by a method in which the surface of a primary prepreg consisting of carbon fiber, and an epoxy resin, i.e., matrix resin, is coated with resin particles that are simply in the form of particles; a method in which a mixture of these particles dispersed uniformly in an epoxy resin, i.e., matrix resin, is prepared and used to impregnate carbon fiber, and during this impregnation process, the reinforcement fiber works to prevent the penetration of these particles to allow the particles to be localized near the surface of the prepreg; and a method in which a primary prepreg is prepared in advance by impregnating carbon fiber with an epoxy resin, and a thermosetting resin film containing these particles at a high concentration is bonded to the surfaces of the primary prepreg. The uniform existence of resin particles in the region accounting for 20% of the thickness of the prepreg serves to produce a prepreg for fiber composite material production having high interlaminar toughness.

The prepreg according to the present invention can be produced favorably by some different methods including a wet method in which the epoxy resin composition according to the present invention is dissolved in a solvent such as methyl ethyl ketone and methanol to produce a solution with a decreased viscosity, and then used to impregnate reinforcement fiber, and a hot melt method in which the epoxy resin composition is heated to decrease its viscosity and then used to impregnate reinforcement fiber.

In the wet method, the reinforcement fiber is immersed in a solution of the epoxy resin composition and then pulled out, and the solvent is evaporated using a tool such as oven to provide a prepreg.

In the hot melt method, an epoxy resin composition, with its viscosity decreased by heating, is used directly to impregnate reinforcement fiber. Alternatively, resin films are prepared by coating release paper or the like with an epoxy resin composition and the resin films are used to cover either or both sides of reinforcement fiber sheets and pressed under heat so that the epoxy resin composition is transferred to them for impregnation, thereby producing a prepreg. This hot melt method is preferred because substantially no solvent will remain in the prepreg.

The fiber-reinforced composite material according to the present invention can be produced by, for instance, stacking a plurality of prepreg sheets prepared by a method as described above and heat and pressure are applied to the resulting layered body to heat-cure the epoxy resin. Namely, in the present invention, the fiber-reinforced composite material is preferably one produced by curing the prepreg.

The application of heat and pressure is carried out by using an appropriate method such as press molding, autoclave molding, bagging molding, wrapping tape molding, and internal pressure molding. In particular, wrapping tape molding and internal pressure molding have been preferred for production of molded sports goods.

In the wrapping tape molding method, a core bar such as mandrel is wound with a prepreg to produce a tube of fiber-reinforced composite material, and this method is suitable for manufacturing rod-like products including golf club shaft and fishing rod. More specifically, a mandrel is wound with a prepreg and further wound with a wrapping tape of thermoplastic resin film to cover the prepreg so that the prepreg is secured and pressed, followed by heating and curing the epoxy resin in an oven and removing the core bar to provide a tubular material.

In the internal pressure molding method, a preform formed of an internal pressure-applying body such as a tube of thermoplastic resin wound with a prepreg is fixed in a mold, and high pressure gas is introduced into the internal pressure-applying body to apply pressure and heat the mold simultaneously to produce a tube-like body. The internal pressure molding method has been preferred particularly for the molding of articles of a complicated shape such as golf club shaft, bat, and rackets for tennis and badminton.

As an example, the carbon fiber-reinforced composite material according to the invention can be produced by stacking sheets of the aforementioned prepreg according to the invention into a required shape and subsequently pressed under heat to cure the epoxy resin.

In another process, the fiber-reinforced composite material according to the invention can also be produced from the aforementioned epoxy resin composition through a prepreg-free process. Therefore, the fiber-reinforced composite material according to the present invention encompasses a fiber-reinforced composite material including the cured epoxy resin composition according to the present invention and reinforcement fibers.

This can be effected by, for instance, impregnating reinforcement fiber directly with the epoxy resin composition according to the invention, and subsequently heat-curing it, and available techniques include hand lay-up, filament winding, pultrusion, resin film infusion, resin injection molding, and resin transfer molding.

EXAMPLES

An epoxy resin composition according to the present invention, and a prepreg and fiber-reinforced composite material produced therefrom will be described more in detain below by way of examples. Described below are the resin materials used in Examples and the preparation and evaluation methods used for prepregs and fiber-reinforced composite materials. Preparation and evaluation of prepregs in Examples were performed in an atmosphere with a temperature of 25° C.±2° C. and relative humidity of 50% unless otherwise specified.

<Carbon Fiber (Reinforcement Fiber)>

"Torayca (registered trademark)" T800G-24K-31E (carbon fiber with 24,000 filaments/bundle, tensile strength of 5.9 GPa, tensile modulus of 294 GPa, tensile elongation of 2.0%, supplied by Toray Industries, Inc.).

<Epoxy Resin [A]>

"Sumiepoxy (registered trademark)" ELM434 (tetraglycidyl diaminodiphenyl methane, supplied by Sumitomo Chemical Co., Ltd.)

GAN (N-diglycidyl aniline, supplied by Nippon Kayaku Co., Ltd.)

"jER (registered trademark)" 828 (bisphenol A type epoxy resin, supplied by Mitsubishi Chemical Corporation)

"EPICLON (registered trademark)" 830 (bisphenol F type epoxy resin, supplied by DIC)

"EPICLON (registered trademark)" HP 7200H (dicyclopentadiene backbone-bearing epoxy resin, supplied by DIC Corporation)

<Curing Agent [C]>

3, 3'-DAS (3,3'-diaminodiphenyl sulfone, supplied by Mitsui Fine Chemical, Inc.)

<Composite Polyamide Fine Particles [B]>

The composite polyamide fine particles in the present invention were obtained based on the following production examples.

Production Example 1

Production of Composite Polyamide Fine Particles
(Particle 1)

In a 1,000 mL pressure resistant glass autoclave (Hyperglasstor TEM-V1000N, supplied by Taiatsu Techno Corporation), 18.9 g of transparent polyamide (weight average molecular weight 17,000, "TROGAMID (registered trademark)" CX7323 supplied by Daicel-Evonik Ltd., SP value 23.3 $(J/cm^3)^{1/2}$) as polyamide (B1), 2.1 g of polyamide elastomer (weight average molecular weight 27,000, "VESTAMIDE (registered trademark)" EX9200 supplied by Daicel-Evonik Ltd., SP value 20.6 $(J/cm^3)^{1/2}$) as thermoplastic elastomer resin (B2), 42 g of polyvinyl alcohol ("Gohsenol (registered trademark)" GM-14 supplied by Nippon Synthetic Chemical Industry Co., Ltd., weight average molecular weight 29,000, SP value 32.8 $(J/cm^3)^{1/2}$), 287 g of N-methyl-2-pyrolidone as an organic solvent were fed, and the autoclave was filled with nitrogen to more than 99 volume %, followed by heating at 180° C. and stirring for 4 hours to ensure dissolution of the polymers. Here, the oxygen concentration is theoretically 1% or less. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 19.5 g of a white solid material. The resulting powder was observed by scanning electron microscopy and found to be spherical rein fine particles with an average particle diameter of 14 μm, a particle diameter distribution index of 1.17 and a sphericity of 96. The resulting resin fine particles were embedded in epoxy resin, and an ultrathin section was prepared, and then observed by transmission electron microscopy. The result showed that domains mainly composed of a polyamide elastomer and having an average particle diameter of 520 nm were dispersed in a matrix mainly composed of polyamide. The result of 1H-NMR measurement showed that the content of the polyamide elastomer in the resin fine particles was 8.5 volume %. In this example, the transparent polyamide had a melting point of 250° C., and the polyamide elastomer had a melting point of 176° C. The SP value was determined by a calculation method. The transparent polyamide had a SP value of 23.3 $(J/cm^3)^{1/2}$, and the polyamide elastomer had a SP value of 20.6 $(J/cm^3)^{1/2}$.

Production Example 2

Production of Composite Polyamide Fine Particles
(Particle 2)

In a 1,000 mL pressure resistant glass autoclave (Hyperglasstor TEM-V1000N, supplied by Taiatsu Techno Corporation), 14.7 g of transparent polyamide (weight average molecular weight 17,000, "TROGAMID (registered trademark)" CX7323 supplied by Daicel-Evonik Ltd., SP value 23.3 $(J/cm^3)^{1/2}$) as polyamide (B1), 6.3 g of polyamide elastomer (weight average molecular weight 27,000, "VESTAMIDE (registered trademark)" EX9200 supplied by Daicel-Evonik Ltd., SP value 20.6 $(J/cm^3)^{1/2}$) as thermoplastic elastomer resin (B2), 42 g of polyvinyl alcohol ("Gohsenol (registered trademark)" GM-14 supplied by Nippon Synthetic Chemical Industry Co., Ltd., weight average molecular weight 29,000, SP value 32.8 $(J/cm^3)^{1/2}$), 287 g of N-methyl-2-pyrolidone as an organic solvent were fed, and the autoclave was filled with nitrogen to more than 99 volume %, followed by heating at 180° C. and stirring for 4 hours to ensure dissolution of the polymers. Here, the oxygen concentration is theoretically 1% or less. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 19.9 g of a white solid material. The resulting powder was observed by scanning electron microscopy and found to be spherical rein fine particles with an average particle diameter of 11.9 μm, a particle diameter distribution index of 1.20 and a sphericity of 97. The resulting resin fine particles were embedded in epoxy resin, and an ultrathin section was prepared, and then observed by transmission electron microscopy. The result showed that domains mainly composed of a polyamide elastomer and having an average particle diameter of 2300 nm were dispersed in a matrix mainly composed of polyamide. The result of $^1$H-NMR measurement showed that the content of the polyamide elastomer in the resin fine particles was 28.5 volume %. In this example, the transparent polyamide had a melting point of 250° C., and the polyamide elastomer had a melting point of 176° C. The SP value was determined by a calculation method. The transparent polyamide had a SP value of 23.3 $(J/cm^3)^{1/2}$, and the polyamide elastomer had a SP value of 20.6 $(J/cm^3)^{1/2}$.

Production Example 3

Production of Composite Polyamide Fine Particles
(Particle 3)

In a 1,000 mL pressure resistant glass autoclave (Hyperglasstor TEM-V1000N, supplied by Taiatsu Techno Corporation), 14.7 g of transparent polyamide (weight average molecular weight 17,000, "TROGAMID (registered trademark)" CX7323 supplied by Daicel-Evonik Ltd., SP value 23.3 $(J/cm^3)^{1/2}$) as polyamide (B1), 6.3 g of polyamide elastomer (weight average molecular weight 27,000, "VESTAMIDE (registered trademark)" EX9200 supplied by Daicel-Evonik Ltd., SP value 20.6 $(J/cm^3)^{1/2}$) as thermoplastic elastomer resin (B2), 42 g of polyvinyl alcohol "Gohsenol (registered trademark)" GM-14 supplied by Nippon Synthetic Chemical Industry Co., Ltd., weight average molecular weight 29,000, SP value 32.8 $(J/cm^3)^{1/2}$), 287 g of N-methyl-2-pyrolidone as an organic solvent were fed, and the autoclave was filled with nitrogen to more than 99 volume %, followed by heating at 180° C. and stirring for 4 hours to ensure dissolution of the polymers. Here, the oxygen concentration is theoretically 1% or less. Subsequently, 105 g of ion-exchanged water, used as poor solvent, was supplied through a solution feeding pump, and dropped at a rate of 0.58 g/min, and further, 105 g of ion-exchanged water, used as poor solvent, was supplied through a solution feeding pump, and dropped at a rate of 16.7 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 20.5 g of a white solid material. The resulting powder was observed by scanning electron microscopy and found to be highly spherical fine particles of polyamide with an average particle diameter of 9.7 μm, a particle diameter distribution index of 1.22 and a sphericity of 94. The resulting resin fine particles were embedded in epoxy resin, and an ultrathin section was prepared, and then observed by transmission electron microscopy. The result showed that domains mainly composed of a polyamide elastomer and having an average particle diameter of 510 nm were dispersed in a matrix mainly composed of polyamide. The result of $^1$H-NMR measurement showed that the content of the polyamide elastomer in the resin fine particles was 26.1 volume %. In this example, the transparent polyamide had a melting point of 250° C., and the polyamide elastomer had a melting point of 176° C. The SP value was determined by a calculation method. The transparent polyamide had a SP value of 23.3 $(J/cm^3)^{1/2}$, and the polyamide elastomer had a SP value of 20.6 $(J/cm^3)^{1/2}$.

Production Example 4

Production of Composite Polyamide Fine Particles (Particle 4)

In a 1,000 mL pressure resistant glass autoclave (Hyperglasstor TEM-V1000N, supplied by Taiatsu Techno Corporation), 19.95 g of transparent polyamide (weight average molecular weight 17,000, "TROGAMID (registered trademark)" CX7323 supplied by Daicel-Evonik Ltd., SP value 23.3 $(J/cm^3)^{1/2}$) as polyamide (B1), 1.05 g of polyester elastomer "Hytrel (registered trademark)" 7247 (weight average molecular weight 27,000, supplied by DU PONT-TORAY CO., LTD.) as thermoplastic elastomer resin (B2), 42 g of polyvinyl alcohol ("Gohsenol (registered trademark)" GM-14 supplied by Nippon Synthetic Chemical Industry Co., Ltd., weight average molecular weight 29,000, SP value 32.8 $(J/cm^3)^{1/2}$), 287 g of N-methyl-2-pyrolidone as an organic solvent were fed, and the autoclave was filled with nitrogen to more than 99 volume %, followed by heating at 180° C. and stirring for 4 hours to ensure dissolution of the polymers. Here, the oxygen concentration is theoretically 1% or less. Subsequently, 350 g of ion-exchanged water, used as poor solvent, was supplied through a solution feeding pump, and dropped at a rate of 2.92 g/min. The solution turned to white when about 200 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 18.8 g of a white solid material. The resulting powder was observed by scanning electron microscopy and found to be spherical rein fine particles with an average particle diameter of 13.6 μm, a particle diameter distribution index of 1.23 and a sphericity of 94. The resulting resin fine particles were embedded in epoxy resin, and an ultrathin section was prepared, and then observed by transmission electron microscopy. The result showed that domains mainly composed of a polyester elastomer and having an average particle diameter of 280 nm were dispersed in a matrix mainly composed of polyamide. The result of $^1$H-NMR measurement showed that the content of the polyester elastomer in the resin fine particles was 4.1 volume %. In this example, the transparent polyamide had a melting point of 250° C., and the polyester elastomer had a melting point of 218° C. The SP value was determined by a calculation method. The transparent polyamide had a SP value of 23.3 $(J/cm^3)^{1/2}$, and the polyester elastomer had a SP value of 24.3 $(J/cm^3)^{1/2}$.

Production Example 5

Production of Particle 5 (by Reference to International Publication WO 2012/043509)

(Constituent [B] is Particles Including Only Polyamide (B1) as a Constituent Component)

In a 1,000 ml pressure resistant glass autoclave (Hyperglasstor TEM-V1000N, supplied by Taiatsu Techno Corporation), 21 g of transparent polyamide "TROGAMID (registered trademark)" CX7323 (weight average molecular weight 17,000, supplied by Daicel-Evonik Ltd., SP value 23.3 $(J/cm^3)^{1/2}$), 287 g of N-methyl-2-pyrolidone as an organic solvent, and 42 g of polyvinyl alcohol having a sodium acetate content of 0.1% or less (weight average molecular weight 29,000, SP value 32.8 $(J/cm^3)^{1/2}$) were fed and the autoclave was filled with nitrogen to more than 99 vol. %, followed by heating at 180° C. and stirring for 4 hours to ensure dissolution of the polymers. Here, the oxygen concentration is theoretically 1% or less. Subsequently, 350 g of ion-exchanged water, used as poor solvent, was supplied through a solution feeding pump, and dropped at a rate of 2.91 g/min. The solution turned to white when about 30 g of the ion-exchanged water had been added. After finishing the addition of the total quantity of water, the temperature was lowered while continuing stirring, and the resulting suspension liquid was filtered, followed by reslurry washing with 700 g of ion-exchanged water and separation of solid material, which was then vacuum-dried at 80° C. for 10 hours to provide 20.0 g of a white solid material. The resulting powder was observed by scanning electron microscopy and found to be highly spherical fine particles of polyamide with an average particle diameter of 12.4 μm and particle diameter distribution index of 1.30.

Production Example 6

Production of Particle 6

(Constituent [B] is Particles Including Only Thermoplastic Elastomer Resin (B2) as a Constituent Component)

By reference to Japanese Unexamined Application Patent Publication No. 2008-239638, saccharified reduced starch (supplied by Wako Pure Chemical Industries, Ltd.) as matrix resin, and polyamide elastomer (weight average molecular weight 27,000, "VESTAMIDE (registered trademark)" EX 9200 supplied by Daicel-Evonik Ltd., SP value 20.6 (J/cm$^3$)$^{1/2}$) were kneaded in Labo Plastomill at 180° C. at a rotation number of 50 for 10 minutes, the kneaded product was taken out, cooled, and washed with water in an amount larger by a factor of 10 than that of the kneaded product, and the matrix resin was removed to provide polyamide elastomer particles. The resulting particles had a number average particle diameter of 10.5 μm and a particle diameter distribution index of 1.53.

(1) Method for Measurement of Average Particle Diameter, Particle Diameter Distribution Index and Sphericity of Composite Polyamide Fine Particles The particle diameters of individual resin fine particles were measured by observing the resin fine particles by scanning electron microscopy (JSM-6301 NF scanning electron microscope supplied by JEOL Ltd.) at a magnification of 1,000. Here, in the case where the particle was not perfectly circular, its major axis (maximum diameter) was measured and used as its particle diameter. To determine the average particle diameter, 100 particles in the photograph were randomly selected and their diameters (particle diameters) were measured, followed by calculating the arithmetic average.

The particle diameter distribution index, which represents the particle diameter distribution, was calculated by the following numeric conversion equations using the diameters of individual particles determined above.

$$Dn = \sum_{i=1}^{n} Di/n \quad \text{[Formula 5]}$$

$$Dv = \sum_{i=1}^{n} Di^4 \bigg/ \sum_{i=1}^{n} Di^3$$

$$PDI = Dv/Dn$$

Here, Di denotes the particle diameter of a particular particle, n denotes the number of measurements (100), Dn denotes the number average particle diameter, Dv denotes the volume average particle diameter, and PDI denotes the particle diameter distribution index.

The sphericity is determined in the following manner: the minor and major axes of each of 30 particles selected in the observation of particles with a scanning electron microscope are measured, and the sphericity is calculated in accordance with the following equation.

$$S = \frac{\sum_{i=1}^{n} (D_{Si}/D_{Li})}{n} \times 100 \quad \text{[Formula 6]}$$

S denotes the sphericity, $D_{Si}$ denotes the minor axis, $D_{Li}$ denotes the major axis, and n denotes the number of measurements (30).

(2) Method for Observation of Dispersion Structure

A resin fine particle was embedded in an epoxy resin for an electron microscope, cured, and then frozen and cut to a thickness of 0.1 μm, and the dispersion structure was observed using a transmission electron microscope (H-7100 supplied by Hitachi, Ltd.).

(3) Measurement of Average Particle Diameter of Domains

The cross-sectional areas of 50 domains randomly selected in the transmission electron microscope photograph obtained in the observation in (2) were each measured, and converted into a diameter of a perfect circle with an area equal to that of the domain in accordance with the following numeric conversion equation, the thus-obtained values were averaged, and the thus-obtained average value was defined as an average particle diameter of domains.

$$D_{domain} = \frac{\sum_{i=1}^{n} \sqrt{4Si/\pi}}{n} \quad \text{[Formula 7]}$$

Here, $D_{domain}$ denotes the average particle diameter of domains, Si denotes the cross-sectional area of each domain, and n denotes the number of measurements (50).

(4) Determination of Melting Point and Glass Transition Temperature by Differential Scanning Calorimetry Using a differential scanning calorimeter (Robot DSC supplied by Seiko Instruments Inc.), a polymer in the form of a specimen was once heated at a temperature rise rate of 20° C./minute from 30° C. to a temperature higher than the melting point of the polymer by 30° C., then held at this temperature for 1 minute, then cooled to 0° C. at a temperature drop rate of 20° C./minute, held at this temperature for 1 minute, and the heated again at a temperature rise rate of 20° C./minute to obtain a DSC curve. The temperature at the top of a melt peak observed in the obtained DSC curve was defined as a melting point.

The DSC curve as referred to herein is a curve drawn in differential scanning calorimetry where the difference between inputs of heat energy per unit time, which is applied to a specimen and a reference substance in such a manner that the temperature of the specimen was equal to that of the reference substance, is plotted on the ordinate, and the temperature is plotted on the abscissa.

In the DSC curve obtained with the above-mentioned second heating, the glass transition temperature was defined as the temperature at the point where the straight line that is at the same distance in the vertical direction from the extensions of the baselines on the low-temperature side and the high-temperature side intersects the curve that changes stepwise due to glass transition.

(5) Method for Analysis of Composition of Resin Fine Particles

The obtained resin fine particles were subjected to $^1$H-NMR (JNM-AL400 supplied by JEOL Ltd.) measurement using deuterated hexafluoroisopropyl alcohol as a solvent, and the composition ratio of polyamide (B1) and thermoplastic elastomer resin (B2) was determined.

(6) Preparation of Epoxy Resin Composition

A predetermined amount of components other than a curing agent and resin particles were added in a kneader in a blending ratio as shown in Table 1, and heated to 160° C.

while being kneaded, and the mixture was kneaded at 160° C. for 1 hour to provide a transparent viscous liquid. The liquid was cooled to 80° C. while being kneaded, a predetermined amount of a curing agent and resin particles were then added, and the mixture was further kneaded to provide an epoxy resin composition.

(7) Measurement of Flexural Modulus of Cured Resin

The epoxy resin composition prepared in (6) was degassed in vacuum, and then injected in a mold set to have a thickness of 2 mm using a 2 mm-thick spacer made of "Teflon (registered trademark)". The composition was cured at a temperature of 180° C. for 2 hours to provide a 2 mm-thick cured resin. Next, a specimen having a width of 10 mm and a length of 60 mm was cut out from the obtained cured resin plate, and subjected to three-point bending measurement with a span distance of 32 mm, and the flexural modulus was determined in accordance with JIS K7171-1994.

(8) Measurement of Toughness ($K_{IC}$) of Cured Resin

The epoxy resin composition prepared in (6) was degassed in vacuum, and then cured at a temperature of 180° C. for 2 hours in a mold set to have a thickness of 6 mm using a 6 mm-thick spacer made of "Teflon (registered trademark)", thereby providing a 6 mm-thick cured resin. The cured resin was cut to a size of 12.7×150 mm to provide a specimen. Processing and experiments were carried out in accordance with ASTM D5045 (1999) using an Instron type universal tester (supplied by Instron Corporation), and toughness was evaluated. Initial introduction of pre-cracks into the specimen was performed in the following manner: the edge of a razor cooled to the temperature of liquid nitrogen was brought into contact with the specimen, and an impact was applied to the razor with a hammer. The toughness of cured resin as referred to herein is a critical stress expansion factor in deformation Mode I (opening type).

(9) Preparation of Prepreg

The epoxy resin composition was spread over a piece of release paper with a knife coater to prepare a resin film. Then, carbon fibers of "Torayca (registered trademark)" T800G-24K-31 E supplied by Toray Industries, Inc. were paralleled in one direction to form a sheet, and two resin films were used to cover both sides of the carbon fiber sheet and pressed under heat to impregnate the carbon fibers with the resin to provide a unidirectional prepreg with a carbon fiber basis weight of 190 g/m² and a matrix resin weight fraction of 35.5%. In doing this, two-step impregnation was carried out to produce a prepreg in which resin particles were extremely localized near the surfaces.

To provide a resin film for primary prepreg production, an epoxy resin composition containing no resin particles and containing the same components as described in Table 1 except for resin particles was prepared by the same procedure as specified in (6). This epoxy resin composition was spread over a piece of release paper with a knife coater to provide a resin film with a basis weight of 30 g/m², which corresponds to 60 mass % of the normal value. Then, carbon fibers of "Torayca (registered trademark)" T800G-24K-31 E supplied by Toray Industries, Inc. were paralleled in one direction to form a sheet, and two resin films were used to cover both sides of the carbon fiber sheet and pressed under heat using heating rollers at a temperature of 100° C. and an air pressure of 1 atm to impregnate the carbon fibers with the resin to provide a primary prepreg.

To provide a resin film for two-step impregnation, an epoxy resin composition containing the same components as described in Table 1 except for resin particles and containing resin particles in an amount of parts by mass (64 parts by mass) equivalent to a mass content (31.3 parts by mass) larger by a factor of 2.5 than the mass content (12.5 mass %) described in Table 1 based on the total amount of the epoxy resin composition was prepared by the same procedure as specified in (6). This epoxy resin composition was spread over a piece of release paper with a knife coater to provide a resin film with a basis weight of 20 g/m², which corresponds to 40 mass % of the normal value. Such films were used to sandwich a primary prepreg and pressed under heat using heating rollers at a temperature of 80° C. and an air pressure of 1 atm to provide a prepreg in which resin particles were extremely localized near the surfaces. The use of this two-step impregnation process serves to produce a prepreg in which resin particles are extremely localized near the surfaces although as a whole the epoxy resin composition constituting the prepreg contains the same quantity of resin particles as specified in the particle content list in Table 1.

(10) Proportion of Constituent [B] Existing in the Depth Range of 20% of the Prepreg Thickness The prepreg prepared was interposed between two polytetrafluoroethylene resin plates with smooth surfaces and brought into close contact, then the temperature is increased gradually for 7 days up to 150° C. to ensure gelation and curing, thus producing a plate-like cured resin. After the completion of curing, the cured body was cut in a direction perpendicular to the contact interface, and the cross section was polished and photographed with an optical microscope at a magnification of 200 or more in such a manner that the upper and lower surfaces (both surfaces) of the prepreg were included in the field of view. The photograph was taken in such a manner that the longitudinal direction of the photograph corresponded to the thickness direction of the prepreg, and the lateral direction of the photograph corresponded to the surface direction of the prepreg. According to the same procedure, the distance between the polytetrafluoroethylene resin plates was measured at five points aligned in the lateral direction in the cross-sectional photograph, and the average (n=10) was assumed to represent the thickness of the prepreg.

On the photograph of the cured prepreg, two lines parallel to the surface of the prepreg were drawn over the depth range of 20% of the thickness from the surface of the cured prepreg on both surface sides of the prepreg, and subsequently, the total area of the particles existing between each surface of the prepreg and each of the lines drawn as described above and the total area of constituent [B] existing across the entire thickness of the prepreg were determined, followed by calculating the proportion of the number of particles existing in the regions of 20% depth from the prepreg surfaces to the total amount of constituent [B] existing across the entire (100%) thickness of the prepreg. Here, the total area of constituent [B] was determined by cutting constituent [B] out of a cross-sectional photograph and converting their mass. In the case where it was difficult to discriminate constituent [B] dispersed in the resin in the photograph, constituent [B] was appropriately stained and photographed.

(11) Preparation of Composite Material Plate for Mode I Interlaminar Toughness ($G_{IC}$) Test and Implementation of $G_{IC}$ Measurement By the following procedure from (a) to (e), composite material plates for Mode I interlaminar toughness ($G_{IC}$) were test prepared according to JIS K7086 (1993) (if there is some difference between the procedure described in JIS K7086 (1993) and the following procedure from (a) to (e), the following procedure from (a) to (e) shall be employed).

(a) A total of 20 unidirectional prepreg plies as prepared in (9) were laminated with their fibers aligned in one direction. A fluorine resin film with a width of 40 mm and a thickness of 10 μm was interposed at the center of the laminate (between the 10th and the 11th ply) in such a manner that the width direction of the fluorine resin film was perpendicular to the fiber arrangement direction.

(b) The laminated prepreg plies were covered with a nylon film without leaving gaps, and heated and pressurized to be cured in an autoclave at 180° C. and an internal pressure of 588 kPa for 2 hours, thereby forming an unidirectional fiber-reinforced composite material.

(c) The unidirectional fiber-reinforced composite material obtained in step (b) was cut to a width of 20 mm and a length of 195 mm to provide a specimen. Cutting was performed so that the fibers were parallel to the length direction of the specimen.

(d) According to JIS K7086 (1993), a block (aluminum, length 25 mm) for pin load application was attached to an end (where the film was located) of the specimen.

(e) White paint was applied to both side faces of the specimen to ensure easy observation of the progress of cracking.

The composite material plate prepared above was used to make $G_{IC}$ measurements by the following procedure.

Test was carried out using an Instron type universal tester (supplied by Instron Corporation) according to Appendix 1 of JIS K7086 (1993). The crosshead speed was 0.5 mm/min before the length of the crack reached 20 mm and 1 mm/min after it reached 20 mm. According to JIS K7086 (1993), $G_{IC}$ ($G_{IC}$ at the initial point of cracking) corresponding to the critical load at the initial point of cracking was calculated from the load, displacement, and crack length.

(12) Measurement of Interlayer Thickness of Fiber-Reinforced Composite Material

A total of 20 unidirectional prepreg plies as prepared in (9) were laminated with their fibers aligned in one direction. The laminated prepreg plies were covered with a nylon film without leaving gaps, and heated and pressurized to be cured in an autoclave at 180° C. and an internal pressure of 588 kPa for 2 hours, thereby forming an unidirectional fiber-reinforced composite material. This was cut in a direction perpendicular to the carbon fibers, and the cross section was polished and photographed with an optical microscope at a magnification of 200 or more. In an appropriately-selected region between fiber layers in the photograph, a line parallel to the carbon fiber layers was drawn so that it represented a carbon fiber volume content of 50%, and it was assumed to be a boundary line between the internal region of the fiber layer and the interlayer region between the fiber layers. A boundary line averaged over a length of 100 μm was drawn, and the distance between them was assumed to represent the interlayer thickness. The same procedure was carried out for five appropriately selected interlayer regions, and the average was adopted.

(13) Measurement of Compressive Strength Under Wet Heat Conditions of Fiber-Reinforced Composite Material A total of 12 unidirectional prepreg plies as prepared in (9) were laminated with their fibers aligned in one direction, and molded in an autoclave under the conditions of a pressure of 0.59 MPa, a heating rate of 1.5° C./min, and 2 hours at a temperature of 180° C. to provide a laminate body. From this laminate body, a tabbed specimen with a thickness of 2 mm, width of 15 mm, and length 78 mm was prepared. Here, the test was prepared in such a manner that the length direction of the specimen was parallel to the fibers. The specimen was immersed in warm water at 71° C. for 14 days. This specimen was subjected to 0° compressive strength measurement at 82° C. using a universal tester equipped with a temperature controlled bath according to JIS K7076 (1991). Namely, the compressive strength in compression along fibers was measured. Five specimens were prepared (n=5).

Example 1

A kneader was used to prepare an epoxy resin composition in the same procedure as specified in (6) in accordance with the blending ratio described in Table 1. For the resulting epoxy resin composition, the flexural modulus and $K_{IC}$ of the cured resin were measured in the same manner as in the measurement of the flexural modulus of the cured resin in (7) and the toughness ($K_{IC}$) of the cured resin in (8), respectively. Besides, the same procedure as specified in (9) was carried out to provide a prepreg in which particle 1 was extremely localized near the surface. Using the resulting prepreg, the proportion of constituent [B] existing in the depth range of 20% of the thickness of the prepreg, the $G_{IC}$ value and the interlayer thickness were measured in the same manner as described in (10) "Proportion of constituent [B] existing in the depth range of 20% of the prepreg thickness", (11) "Preparation of composite material plate for Mode I interlaminar toughness ($G_{IC}$) test and implementation of $G_{IC}$ measurement" and (12) "Measurement of interlayer thickness of fiber-reinforced composite material".

Results are given in Table 1.

TABLE 1

| | | | Example 1 | Example 2 | Example 3 | Example 4 | Comparative example 1 | Comparative example 2 |
|---|---|---|---|---|---|---|---|---|
| Components of epoxy resin composition | Components other than resin particles | Epoxy resin [A] | | | | | | |
| | | "Sumiepoxy (registered trademark)" ELM434 | | 60 | 60 | 60 | 50 | 50 |
| | | GAN | | 30 | 30 | 20 | 30 | 30 |
| | | "jER (registered trademark)" 828 | 60 | | | | | |
| | | "EPICLON (registered trademark)" 830 | | 10 | 10 | 20 | 10 | 10 |
| | | "EPICLON (registered trademark)" HP 7200H | 40 | | | | | |
| | | Curing agent [C] | | | | | | |
| | | 3,3'-DAS | 40 | 40 | 40 | 40 | 40 | 40 |
| | Resin particles | Composite polyamide fine particles [B] | | | | | | |
| | | Particle 1 | 20 | | | | | |
| | | Particle 2 | | 20 | | | | |

TABLE 1-continued

| | Example 1 | Example 2 | Example 3 | Example 4 | Comparative example 1 | Comparative example 2 |
|---|---|---|---|---|---|---|
| Particle 3 | | | 20 | | | |
| Particle 4 | | | | 20 | | |
| Particle 5 | | | | | 20 | |
| Particle 6 | | | | | | 20 |
| Amount of resin particles in total resin composition in prepreg (mass %) | 12.5 | 12.5 | 12.5 | 12.5 | 12.5 | 12.5 |
| Proportion of surface particles on surface layer in prepreg (%) (proportion of particles existing in the depth range of 20% on prepreg surface layer) | 96 | 97 | 98 | 96 | 93 | 95 |
| Cured resin characteristics | | | | | | |
| Flexural modulus (MPa) | 3.4 | 3.7 | 3.6 | 3.4 | 3.8 | 3.1 |
| Toughness $K_{IC}$ (MPa·m$^{0.5}$) | 1.2 | 1.3 | 1.5 | 1.4 | 1.0 | 1.1 |
| Characteristics of fiber reinforced composite material | | | | | | |
| Interlaminar toughness $G_{IC}$ (J/m$^2$) | 590 | 670 | 610 | 650 | 460 | 390 |
| Interlayer thickness (μm) | 39.4 | 38.8 | 34.2 | 36.1 | 33.3 | 29.0 |
| Compressive strength under wet heat conditions (MPa) | 1100 | 1110 | 1100 | 1080 | 1070 | 720 |

The prepreg was found to have been impregnated appropriately and had good surface quality, and the proportion of resin particles existing in the 20% depth region was a high 96%, showing that resin particles were localized near the surfaces in the prepreg. As a result, a fiber-reinforced composite material excellent in $G_{IC}$ value was provided.

Examples 2, 3 and 4

Except for using particles composed as specified in Table 1, the same procedure as in Example 1 was carried out to provide an epoxy resin composition and a prepreg. Particles were localized adequately near the surface and the interlayer thicknesses was sufficient, suggesting that the fiber-reinforced composite materials had satisfactory $G_{IC}$ values.

Comparative Example 1

Except for using particles composed as specified in Table 1, the same procedure as in Example 1 was carried out to provide an epoxy resin composition and a prepreg. Since resin particles [B] were polyamide resin particles composed only of polyamide, the resulting cured resin had low toughness, and the $G_{IC}$ value of the fiber-reinforced composite material was very low.

Comparative Example 2

Except that particles corresponding to resin particles [B] were composed only of a thermoplastic elastomer component, the same procedure as in Example 1 was carried out to produce an epoxy resin composition and prepreg. The cured resin prepared using the particles had low toughness, and the $G_{IC}$ value of the fiber-reinforced composite material was very low.

INDUSTRIAL APPLICABILITY

According to the present invention, it is possible to provide fiber-reinforced composite materials having high Mode I interlaminar toughness and high compression strength under wet heat conditions, and they can serve effectively for production of structural members. Their preferred applications in the aerospace industry include, for instance, primary structural members of aircraft such as main wing, tail unit, and floor beam; secondary structural members such as flap, aileron, cowl, fairing, and other interior materials, and structural members of artificial satellites such as rocket motor case. Their preferred applications for general industrial uses include structural members of vehicles such as automobile, ship, and railroad vehicle; and civil engineering and construction materials such as drive shaft, plate spring, windmill blade, various turbines, pressure vessel, flywheel, roller for paper manufacture, roofing material, cable, reinforcing bar, and mending/reinforcing materials. Applications in the sporting goods industry include golf shaft, fishing pole, rackets for tennis, badminton, squash, etc., ice hockey stick, skate, skiing boots and skiing pole.

The invention claimed is:

1. An epoxy resin composition comprising at least the following constituents [A], [B] and [C]:
   [A] epoxy resin;
   [B] composite polyamide fine particles satisfying the following requirements (b1) to (b3):
      (b1) the materials that form the particles are polyamide (B1) and thermoplastic elastomer resin (B2);
      (b2) the melting point or glass transition temperature of polyamide (B1) is higher than 100° C.; and
      (b3) the average particle diameter is 0.1 to 100 μm, and
   [C] curing agent.

2. The epoxy resin composition according to claim 1, wherein constituent [B] has a dispersion structure in which a plurality of domains mainly composed of thermoplastic elastomer resin (B2) are dispersed in a matrix mainly composed of polyamide (B1).

3. The epoxy resin composition according to claim 2, wherein the average particle diameter of the domains mainly composed of thermoplastic elastomer resin (B2) is 0.05 to 50 μm, and the sphericity of constituent [B] is 80 or more.

4. The epoxy resin composition according to claim 1, wherein the relationship of $|\delta_{B1}-\delta_{B2}| \geq 0.1$ [$(J/cm^3)^{1/2}$] is satisfied where the solubility parameters of polyamide (B1) and thermoplastic elastomer resin (B2) are $\delta_{B1}$ and $\delta_{B2}$, respectively.

5. The epoxy resin composition according to claim 1, wherein the content of thermoplastic elastomer resin (B2) is 0.1 to 50 volume % based on the total amount of the composite polyamide fine particles.

6. The epoxy resin composition according to claim 1, wherein the particle diameter distribution index of constituent [B] is 1.0 to 3.0.

7. The epoxy resin composition according claim 1, wherein constituent [A] contains a polyfunctional amine epoxy resin.

8. The epoxy resin composition according to claim 1, wherein constituent [C] is an aromatic polyamine.

9. A prepreg produced by impregnating reinforcement fibers with the epoxy resin composition according to claim 1.

10. The prepreg according to claim 9, wherein constituent [B] is distributed in a higher concentration on the surface of the prepreg than at the inside of the prepreg.

11. The prepreg according to claim 10, wherein 90% or more of constituent [B] is localized within the depth range of 20% of the thickness of the prepreg from the surface of the prepreg.

12. The prepreg according to claim 9, wherein the reinforcement fibers are carbon fibers.

13. A fiber-reinforced composite material produced by curing a prepreg as claimed in claim 9.

14. A fiber-reinforced composite material comprising a cured product of the epoxy resin composition according to claim 1, and reinforcement fibers.

\* \* \* \* \*